United States Patent
Olney

(10) Patent No.: US 10,915,836 B1
(45) Date of Patent: Feb. 9, 2021

(54) SYSTEMS AND METHODS FOR OPERATING A COGNITIVE AUTOMATON

(71) Applicant: Guy B. Olney, Sammamish, WA (US)

(72) Inventor: Guy B. Olney, Sammamish, WA (US)

( * ) Notice: Subject to any disclaimer, the term of this patent is extended or adjusted under 35 U.S.C. 154(b) by 0 days.

(21) Appl. No.: 16/942,345

(22) Filed: Jul. 29, 2020

(51) Int. Cl.
| | |
|---|---|
| *G06N 7/00* | (2006.01) |
| *G06N 3/08* | (2006.01) |
| *G06N 20/00* | (2019.01) |
| *G06F 9/06* | (2006.01) |
| *G06N 3/04* | (2006.01) |
| *G06N 5/04* | (2006.01) |
| *H04Q 9/00* | (2006.01) |

(52) U.S. Cl.
CPC ............... *G06N 20/00* (2019.01); *H04Q 9/00* (2013.01); *G06N 3/04* (2013.01); *G06N 3/08* (2013.01); *G06N 5/047* (2013.01)

(58) Field of Classification Search
CPC ............ G06N 20/00; G06N 3/04; G06N 3/08; G06N 5/047; H04Q 9/00
USPC ................................................ 706/20, 25, 27
See application file for complete search history.

(56) References Cited

U.S. PATENT DOCUMENTS

| | | | | |
|---|---|---|---|---|
| 5,487,133 A * | 1/1996 | Park | ..................... | G06K 9/6215 706/20 |
| 6,195,674 B1 * | 2/2001 | Elbourne | ............... | G06F 9/3879 708/401 |
| 10,210,860 B1 * | 2/2019 | Ward | ..................... | G10L 15/22 |
| 2007/0280348 A1 * | 12/2007 | Tokumitsu | ........... | H04N 19/436 375/240.01 |
| 2012/0216012 A1 * | 8/2012 | Vorbach | ................ | G06F 9/3887 712/11 |
| 2015/0339570 A1 * | 11/2015 | Scheffler | .................. | G06N 3/04 706/16 |
| 2017/0270245 A1 * | 9/2017 | van Rooyen | .......... | G16B 30/00 |
| 2018/0330178 A1 * | 11/2018 | el Kaliouby | ....... | G06K 9/00228 |
| 2019/0319787 A1 * | 10/2019 | Reinders | ............... | H04L 9/0825 |
| 2019/0377580 A1 * | 12/2019 | Vorbach | .............. | G06F 9/30181 |
| 2020/0235807 A1 * | 7/2020 | Mendelsohn | ...... | H04B 7/18515 |

* cited by examiner

*Primary Examiner* — Ly D Pham

(74) *Attorney, Agent, or Firm* — Armstrong Teasdale LLP

(57) ABSTRACT

A cognitive analysis computer device is programmed to a) receive a set of streaming input data from one or more sensors; b) perform spatial abstraction on the set of streaming input data to divide the set of streaming input data into a plurality of input pathways; c) route the set of streaming input data from a plurality of input pathways to a plurality of output pathways based on a context mapping; d) for each output pathway, perform temporal abstraction on the received input values to generate an output value for the corresponding output pathway by accumulating output values from a plurality of sets of streaming input data until at least one output value of the plurality of output values on the plurality of output pathways exceeds a predetermined threshold; and e) compare the plurality of output values to one or more stored sets of data to determine a match.

19 Claims, 18 Drawing Sheets

11x11 Sensor Array
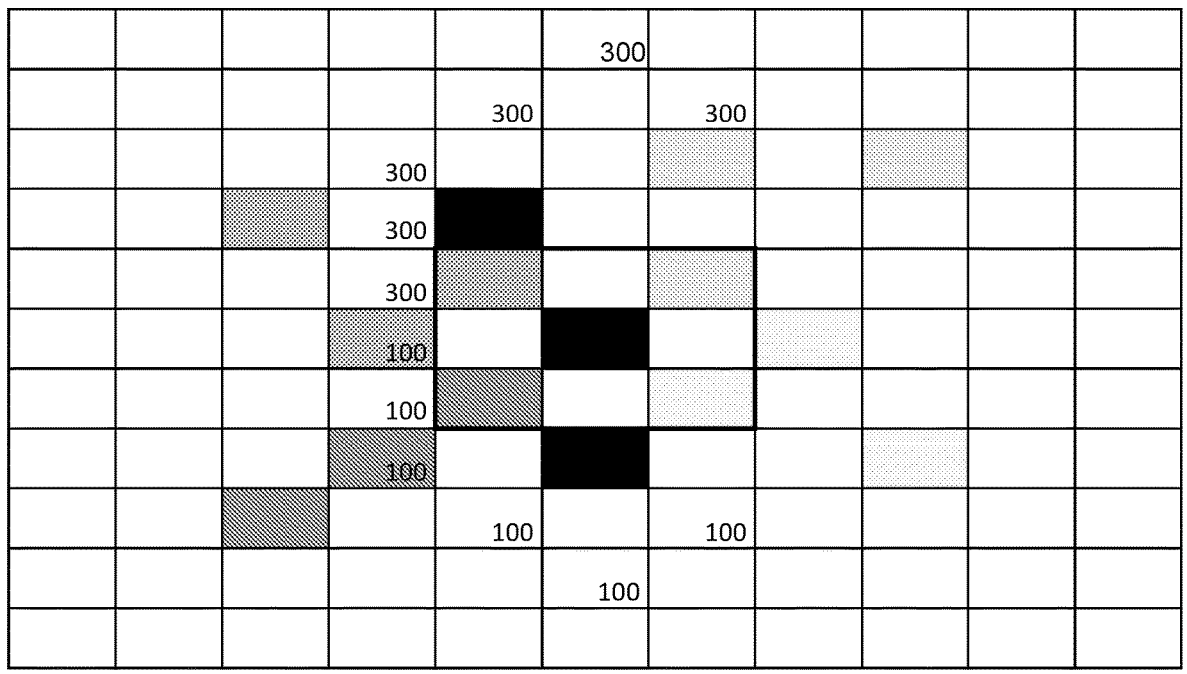
12 output fibers
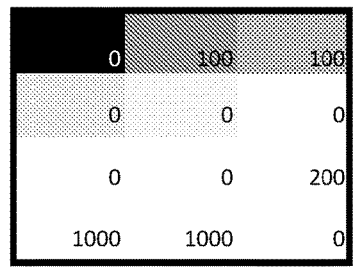
FIG. 2

| | A | | | B | | | | C | | |
|---|---|---|---|---|---|---|---|---|---|---|
| Normal | 0 | 100 | 0 | 200 | 100 | 100 | | 0 | 100 | 0 |
| | 100 | 100 | 100 | 100 | 100 | 200 | | 0 | 0 | 0 |
| | 100 | 0 | 400 | 100 | 300 | 200 | | 0 | 0 | 200 |
| | 400 | 700 | 600 | 0 | 1000 | 200 | | 400 | 400 | 0 |
| Italics | 100 | 200 | 200 | 200 | 100 | 100 | | 0 | 0 | 100 |
| | 200 | 300 | 100 | 200 | 100 | 200 | | 100 | 0 | 0 |
| | 100 | 0 | 200 | 0 | 100 | 200 | | 0 | 100 | 0 |
| | 100 | 600 | 300 | 0 | 1000 | 100 | | 300 | 300 | 100 |
| Small | 0 | 100 | 0 | 200 | 0 | 200 | | 0 | 200 | 0 |
| | 200 | 100 | 100 | 0 | 100 | 200 | | 100 | 0 | 200 |
| | 0 | 0 | 400 | 300 | 300 | 400 | | 100 | 0 | 0 |
| | 400 | 900 | 100 | 100 | 600 | 300 | | 0 | 600 | 0 |
| Colored | 0 | 100 | 0 | 400 | 100 | 300 | | 0 | 100 | 100 |
| | 200 | 100 | 100 | 300 | 100 | 200 | | 0 | 0 | 0 |
| | 100 | 0 | 400 | 300 | 900 | 200 | | 0 | 0 | 200 |
| | 600 | 1200 | 700 | 0 | 1600 | 400 | | 1000 | 1000 | 0 |

FIG. 3

| Initial Dist | A only | A then C | Sorted Initial Dist | Sorted A only | Sorted A then C | Sorted Difference |
|---|---|---|---|---|---|---|
| 81 | 32 | 53 | 13 | 7 | 13 | 6 |
| 33 | 23 | 38 | 22 | 10 | 19 | 9 |
| 119 | 66 | 101 | 28 | 11 | 21 | 10 |
| 99 | 39 | 63 | 28 | 13 | 23 | 10 |
| 137 | 73 | 116 | 29 | 13 | 23 | 10 |
| 100 | 66 | 104 | 33 | 14 | 25 | 11 |
| 22 | 18 | 28 | 35 | 16 | 28 | 12 |
| 60 | 30 | 50 | 37 | 16 | 28 | 12 |
| 128 | 63 | 103 | 42 | 17 | 28 | 12 |
| 53 | 27 | 43 | 43 | 17 | 30 | 13 |
| 58 | 13 | 23 | 46 | 18 | 32 | 14 |
| 96 | 43 | 72 | 47 | 18 | 32 | 14 |
| 79 | 38 | 62 | 47 | 18 | 32 | 13 |
| 54 | 35 | 60 | 48 | 19 | 33 | 13 |
| 47 | 34 | 55 | 49 | 21 | 38 | 17 |
| 111 | 63 | 99 | 49 | 21 | 39 | 18 |
| 98 | 64 | 97 | 51 | 21 | 43 | 23 |
| 46 | 14 | 56 | 53 | 23 | 44 | 21 |
| 88 | 64 | 100 | 53 | 23 | 44 | 21 |
| 96 | 66 | 103 | 53 | 24 | 45 | 21 |
| 118 | 71 | 112 | 54 | 25 | 45 | 20 |
| 114 | 54 | 85 | 57 | 27 | 48 | 21 |
| 106 | 58 | 88 | 57 | 27 | 50 | 23 |
| 146 | 68 | 107 | 58 | 27 | 52 | 25 |
| 76 | 27 | 73 | 58 | 27 | 53 | 26 |
| 123 | 81 | 98 | 58 | 27 | 53 | 26 |
| 85 | 16 | 28 | 58 | 28 | 53 | 24 |
| 90 | 51 | 83 | 59 | 29 | 54 | 25 |
| 78 | 51 | 107 | 60 | 30 | 55 | 25 |
| 53 | 30 | 48 | 60 | 30 | 56 | 26 |
| 68 | 55 | 83 | 61 | 31 | 57 | 26 |
| 112 | 86 | 110 | 62 | 32 | 58 | 27 |
| 70 | 48 | 75 | 63 | 32 | 60 | 28 |
| 113 | 65 | 103 | 64 | 32 | 60 | 28 |
| 73 | 33 | 54 | 66 | 33 | 62 | 29 |
| 127 | 57 | 88 | 68 | 33 | 62 | 28 |
| 72 | 38 | 62 | 69 | 34 | 62 | 28 |
| 62 | 53 | 79 | 70 | 34 | 62 | 28 |
| 57 | 29 | 44 | 70 | 35 | 63 | 28 |
| 78 | 19 | 63 | 70 | 37 | 63 | 27 |

FIG. 5

This is a 9 input to 17 output mapping

| InputPathway | P1 | P2 | P3 | | F1 Dist | | F2 Dist | | F3 Dist | | F4 Dist | | F5 Dist | | F6 Dist | | F7 Dist | | F8 Dist | | F9 Dist | Output Pathway |
|---|---|---|---|---|---|---|---|---|---|---|---|---|---|---|---|---|---|---|---|---|---|---|
| Fiber 1 | 1131 | 4306 | 3078 | 1.00 | 0.4706 | 0.87 | 0.4612 | 0.76 | 0.0000 | 0.66 | 0.2722 | 0.58 | 0.1355 | 0.50 | 0.2656 | 0.44 | 0.1542 | 0.38 | 0.1567 | 0.33 | 0.2926 | 1 |
| | | | | 0.93 | 0.0549 | 0.93 | 0.6588 | 0.81 | 0.0478 | 0.71 | 0.6249 | 0.62 | 0.3992 | 0.54 | 0.2213 | 0.47 | 0.0826 | 0.36 | 0.2399 | 0.36 | 0.3344 | 2 |
| | | | | 0.87 | 0.1025 | 1.00 | 0.2353 | 0.87 | 0.4612 | 0.76 | 0.5803 | 0.66 | 0.6221 | 0.58 | 0.1016 | 0.50 | 0.0000 | 0.44 | 0.0614 | 0.38 | 0.3359 | 3 |
| Fiber 2 | 4633 | 2607 | 2641 | 0.81 | 0.4783 | 0.93 | 0.4941 | 0.93 | 0.9333 | 0.81 | 0.4304 | 0.71 | 0.6666 | 0.62 | 0.3992 | 0.54 | 0.3161 | 0.47 | 0.0000 | 0.41 | 0.1679 | 4 |
| | | | | 0.75 | 0.3571 | 0.87 | 0.3075 | 1.00 | 0.9412 | 0.87 | 0.0000 | 0.76 | 0.7588 | 0.66 | 0.6221 | 0.58 | 0.5420 | 0.50 | 0.4131 | 0.44 | 0.1542 | 5 |
| Fiber 3 | 3253 | 2093 | 2252 | 0.71 | 0.4683 | 0.81 | 0.1913 | 0.93 | 0.3843 | 0.93 | 0.3294 | 0.81 | 0.1923 | 0.71 | 0.0833 | 0.62 | 0.4355 | 0.54 | 0.2213 | 0.47 | 0.3305 | 6 |
| | | | | 0.66 | 0.2722 | 0.76 | 0.3571 | 0.87 | 0.3587 | 1.00 | 0.8824 | 0.87 | 0.8199 | 0.76 | 0.0893 | 0.66 | 0.3500 | 0.58 | 0.1355 | 0.50 | 0.1180 | 7 |
| Fiber 4 | 3113 | 2955 | 4867 | 0.62 | 0.3629 | 0.71 | 0.4999 | 0.87 | 0.8130 | 0.93 | 0.3294 | 0.93 | 0.7686 | 0.81 | 0.0478 | 0.71 | 0.3759 | 0.62 | 0.2803 | 0.54 | 0.0632 | 8 |
| | | | | 0.58 | 0.1016 | 0.66 | 0.1344 | 0.76 | 0.4017 | 0.87 | 0.7686 | 1.00 | 0.8824 | 0.87 | 0.3587 | 0.76 | 0.6696 | 0.66 | 0.0778 | 0.58 | 0.0339 | 9 |
| Fiber 5 | 4278 | 4051 | 3082 | 0.54 | 0.1897 | 0.62 | 0.1815 | 0.71 | 0.1666 | 0.81 | 0.8130 | 0.93 | 0.7686 | 0.93 | 0.3333 | 0.81 | 0.3826 | 0.71 | 0.2916 | 0.62 | 0.4555 | 10 |
| | | | | 0.50 | 0.0590 | 0.58 | 0.3049 | 0.66 | 0.0339 | 0.76 | 0.4910 | 0.87 | 0.1025 | 1.00 | 0.5294 | 0.87 | 0.5124 | 0.75 | 0.0446 | 0.66 | 0.2722 | 11 |
| Fiber 6 | 1942 | 1764 | 1644 | 0.47 | 0.3305 | 0.54 | 0.2845 | 0.62 | 0.1089 | 0.71 | 0.0417 | 0.81 | 0.6217 | 0.93 | 0.8235 | 0.93 | 0.8235 | 0.81 | 0.6227 | 0.71 | 0.7082 | 12 |
| Fiber 7 | 2672 | 228 | 2469 | 0.44 | 0.2313 | 0.50 | 0.0000 | 0.58 | 0.1694 | 0.66 | 0.3111 | 0.76 | 0.7342 | 0.87 | 0.0000 | 1.00 | 0.8235 | 0.87 | 0.6661 | 0.76 | 0.7588 | 13 |
| | | | | 0.41 | 0.4678 | 0.47 | 0.1652 | 0.54 | 0.4110 | 0.52 | 0.4718 | 0.71 | 0.0933 | 0.81 | 0.3348 | 0.93 | 0.8235 | 0.93 | 0.8784 | 0.81 | 0.1435 | 14 |
| Fiber 8 | 117 | 488 | 93 | 0.38 | 0.0224 | 0.44 | 0.2570 | 0.50 | 0.0885 | 0.58 | 0.2371 | 0.66 | 0.6221 | 0.76 | 0.2232 | 0.87 | 0.7174 | 1.00 | 0.0000 | 0.87 | 0.1035 | 15 |
| | | | | 0.36 | 0.1045 | 0.41 | 0.1399 | 0.47 | 0.1377 | 0.54 | 0.3794 | 0.62 | 0.1089 | 0.71 | 0.4166 | 0.81 | 0.5739 | 0.93 | 0.2196 | 0.93 | 0.3643 | 16 |
| Fiber 9 | 4305 | 1612 | 1240 | 0.33 | 0.2731 | 0.38 | 0.0224 | 0.44 | 0.0771 | 0.50 | 0.0295 | 0.58 | 0.0677 | 0.66 | 0.2333 | 0.76 | 0.6696 | 0.87 | 0.4612 | 1.00 | 0.1376 | 17 |
| | | | | 10.36 | | | | | | | | | | | | | | | | | | |

Untrained mapping, there is no distribution bias caused by the data values.
Mapping distribution is Random with a distance bias    Column K1 is a distance distribution, K1 has a random bias applied to K1, etc.

| Output Fiber | | | | | | | | | | Abstracted output |
|---|---|---|---|---|---|---|---|---|---|---|
| 1 | 688.35 | 845.797 | 534.6 | 739.27 | 822.7 | 414.26 | 328.08 | 61.956 | 627.98 | 5123 |
| 2 | 560.6 | 897.995 | 545.37 | 910.93 | 964 | 406.98 | 310.4 | 52.731 | 633.16 | 5292 |
| 3 | 575.24 | 786.141 | 638.46 | 889.22 | 1033 | 387.31 | 290 | 60.978 | 633.35 | 5293 |
| 4 | 690.91 | 854.496 | 744.79 | 816.29 | 1146 | 436.23 | 368.06 | 60.5 | 612.52 | 5630 |
| 5 | 553.61 | 805.198 | 746.55 | 606.8 | 1075 | 472.88 | 423.81 | 64.342 | 610.82 | 5459 |
| 6 | 634.76 | 774.523 | 621.15 | 767.12 | 893.3 | 384.3 | 397.53 | 52.558 | 632.68 | 5224 |
| 7 | 627.48 | 818.31 | 615.38 | 1036.2 | 1094 | 385.28 | 376.4 | 61.76 | 606.34 | 5621 |
| 8 | 655.41 | 856.034 | 717.7 | 767.12 | 1078 | 378.46 | 382.53 | 63.2 | 599.54 | 5498 |
| 9 | 574.98 | 775.346 | 625.07 | 980.89 | 1113 | 429.57 | 425.31 | 63.223 | 595.9 | 5611 |
| 10 | 602.09 | 773.923 | 572.13 | 1003.5 | 1078 | 524.04 | 284.47 | 63.212 | 645.7 | 5644 |
| 11 | 561.86 | 804.511 | 543.36 | 845.77 | 872.5 | 457.64 | 416.52 | 60.915 | 625.45 | 5199 |
| 12 | 645.42 | 799.144 | 559.12 | 627.08 | 1033 | 505.99 | 493.33 | 66.282 | 679.52 | 5408 |
| 13 | 614.9 | 724 | 572.74 | 758.2 | 1061 | 370.6 | 463.33 | 66.695 | 685.8 | 5347 |
| 14 | 668.23 | 767.639 | 627.15 | 836.42 | 866.6 | 425.84 | 493.33 | 68.669 | 609.49 | 5364 |
| 15 | 550.59 | 791.883 | 554.53 | 722.2 | 1033 | 437.29 | 467.12 | 60.5 | 604.41 | 5191 |
| 16 | 573.86 | 755.679 | 565.61 | 791.44 | 874.5 | 439.09 | 431.7 | 62.542 | 639.35 | 5136 |
| 17 | 627.75 | 729.913 | 553.97 | 621.16 | 951.8 | 408.56 | 455.31 | 64.789 | 606.29 | 4923 |

These are the output contributions from each input fiber

The contribution from each input fiber to each output fiber is shown in the columns labeled "F1 Dist" for example. It means the values of any input on F1 fiber is distributed to the 17 output fibers according to the values in that column.

FIG. 7

Bottom 20 memory elements wwith pre-idenified output values

| | | | | | | | | | | | | | | | | | | | | | |
|---|---|---|---|---|---|---|---|---|---|---|---|---|---|---|---|---|---|---|---|---|---|
| 100 | 26 | 30 | 13 | 12 | 15 | 32 | 17 | 23 | 26 | 30 | 18 | 12 | 15 | 12 | 12 | 13 | 13 | 26 | 26 | 15 | 17 | 30 |
| 101 | 17 | 39 | 13 | 9 | 15 | 28 | 17 | 11 | 17 | 30 | 13 | 9 | 15 | 9 | 9 | 13 | 13 | 17 | 17 | 15 | 14 | 22 |
| 102 | 20 | 11 | 8 | 7 | 6 | 21 | 15 | 18 | 20 | 11 | 8 | 7 | 6 | 7 | 7 | 8 | 8 | 20 | 20 | 6 | 15 | 11 |
| 103 | 20 | 20 | 11 | 7 | 10 | 20 | 13 | 20 | 20 | 20 | 11 | 7 | 10 | 7 | 7 | 11 | 11 | 20 | 20 | 10 | 13 | 20 |
| 104 | 28 | 23 | 17 | 9 | 13 | 30 | 10 | 28 | 28 | 23 | 17 | 9 | 13 | 9 | 9 | 17 | 17 | 28 | 28 | 13 | 8 | 14 |
| 105 | 28 | 19 | 14 | 8 | 9 | 22 | 13 | 23 | 28 | 19 | 14 | 8 | 9 | 8 | 8 | 14 | 14 | 28 | 28 | 9 | 10 | 11 |
| 106 | 15 | 2 | 3 | 6 | 2 | 13 | 18 | 10 | 15 | 2 | 3 | 6 | 2 | 6 | 6 | 3 | 3 | 15 | 15 | 2 | 18 | 2 |
| 107 | 33 | 28 | 16 | 15 | 13 | 43 | 25 | 33 | 33 | 28 | 16 | 15 | 13 | 15 | 15 | 16 | 16 | 13 | 13 | 13 | 25 | 28 |
| 108 | 22 | 30 | 9 | 11 | 15 | 25 | 20 | 18 | 22 | 30 | 9 | 11 | 15 | 11 | 11 | 9 | 9 | 22 | 22 | 15 | 20 | 30 |
| 109 | 14 | 21 | 4 | 8 | 11 | 18 | 18 | 13 | 14 | 21 | 4 | 8 | 11 | 8 | 8 | 4 | 4 | 14 | 14 | 11 | 18 | 21 |
| 110 | 25 | 10 | 9 | 9 | 5 | 24 | 13 | 18 | 25 | 10 | 9 | 9 | 5 | 9 | 9 | 9 | 9 | 25 | 25 | 5 | 13 | 10 |
| 111 | 28 | 34 | 13 | 13 | 14 | 33 | 18 | 25 | 28 | 34 | 13 | 13 | 14 | 13 | 13 | 13 | 13 | 28 | 28 | 14 | 20 | 43 |
| 112 | 35 | 22 | 14 | 8 | 12 | 23 | 11 | 32 | 35 | 22 | 14 | 8 | 12 | 8 | 8 | 14 | 14 | 35 | 35 | 12 | 11 | 22 |
| 113 | 33 | 30 | 16 | 13 | 15 | 36 | 24 | 30 | 33 | 30 | 16 | 13 | 15 | 13 | 13 | 16 | 16 | 33 | 33 | 15 | 27 | 38 |
| 114 | 28 | 13 | 9 | 7 | 8 | 19 | 11 | 20 | 28 | 13 | 9 | 7 | 8 | 7 | 7 | 9 | 9 | 28 | 28 | 8 | 11 | 13 |
| 115 | 28 | 35 | 11 | 15 | 15 | 37 | 24 | 23 | 28 | 35 | 11 | 15 | 15 | 15 | 15 | 11 | 11 | 28 | 28 | 15 | 27 | 43 |
| 116 | 33 | 27 | 22 | 9 | 12 | 32 | 12 | 31 | 33 | 27 | 22 | 9 | 12 | 9 | 9 | 22 | 22 | 33 | 33 | 17 | 9 | 18 |
| 117 | 19 | 3 | 6 | 7 | 3 | 26 | 21 | 15 | 19 | 3 | 6 | 7 | 3 | 7 | 7 | 6 | 6 | 19 | 19 | 3 | 21 | 3 |
| 118 | 17 | 8 | 10 | 5 | 3 | 28 | 12 | 13 | 17 | 8 | 10 | 5 | 3 | 5 | 5 | 10 | 10 | 17 | 17 | 3 | 12 | 8 |
| 119 | 21 | 33 | 12 | 13 | 13 | 28 | 14 | 21 | 21 | 33 | 12 | 13 | 13 | 13 | 13 | 12 | 12 | 21 | 21 | 13 | 14 | 33 |
| 120 | 20 | 23 | 9 | 8 | 13 | 19 | 11 | 19 | 20 | 23 | 9 | 8 | 13 | 8 | 8 | 9 | 9 | 20 | 20 | 13 | 11 | 23 |
| Output> | 81 | C4 | C3 | C2 | C1 | B4 | B3 | B2 | B1 | A4 | A3 | A2 | A1 | SeqC2 | SeqC2 | SeqA3 | SeqC3 | SeqB1 | SeqB1 | SeqA1 | B3 | C4 |

Next encounter with slo

|     |    | 789 |     |
|-----|----|-----|-----|
|     |    | 122 |     |
|     |    | 456 |     |
| sln |    | 789 | 959 |
| skk |    | 456 | 456 |
| slo |    | 111 | 789 |
|     | 91 |     | 111 |
|     |    |     | 122 |

|     |    | 9 slo  |
|-----|----|--------|
|     |    | 12 slm |
|     |    | 22 kk  |
|     |    | 46 sln |
|     |    | 67 slm |
|     |    | 89 cc  |
| slo |    | 91 slo |

EDS

The next encounter with sensed slo results in 91 slo presented at the Integration Memory ESD which is a best but inexact match to both 67 and slm with a resulting output of 456 and both reinforcement and sensor values must match within matching limits scanning is from the bottom up

|     |    | 789 |     |
|-----|----|-----|-----|
|     |    | 122 |     |
|     |    | 456 |     |
| sln |    | 789 | 959 |
| skk |    | 456 | 456 |
| slo | 91 | 111 | 789 |
| slo | 20 | 456 | 111 |
|     |    |     | 122 |

|     |    | 9 slo  |
|-----|----|--------|
|     |    | 12 slm |
|     |    | 22 kk  |
|     |    | 46 sln |
|     |    | 67 slm |
|     |    | 89 cc  |
| slo |    | 80 slo |

ESD

Output is tried and results in an 80 reinforcement value from the environment Integration Memory Region EDS fires storing slo 456 with a reinforcement value of 80 Reinforcement value determines the location in memory (Higher value at EDS end) Input Memory region EDS fires storing inverse of 80 with slo

FIG. 12B

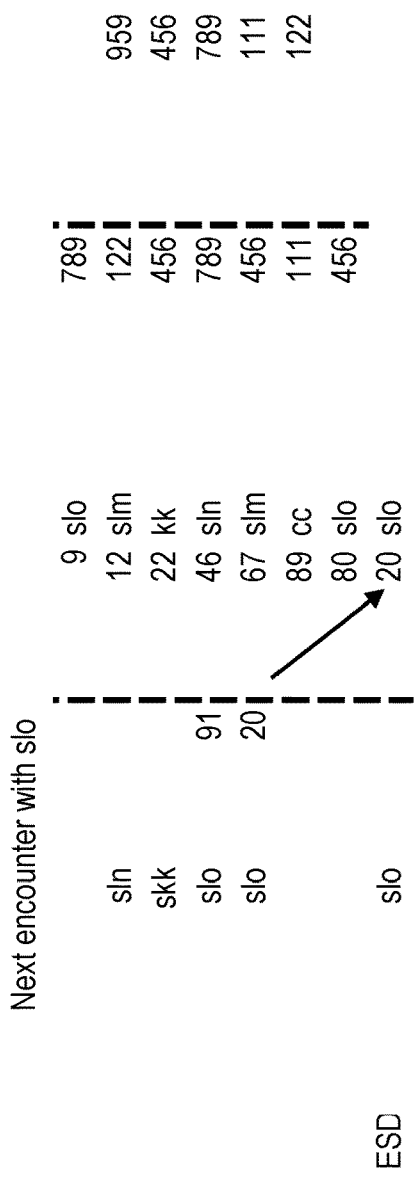

Next encounter with slo

| | | |
|---|---|---|
| sln | 9 slo | 789 |
| skk | 12 slm | 122 |
| slo | 91 | 22 kk | 456 |
| slo | 20 | 46 sln | 789 |
| | 67 slm | 456 |
| | 89 cc | 111 |
| | 80 slo | 456 |
| ESD slo | 20 slo | 959 |
| | | 456 |
| | | 789 |
| | | 111 |
| | | 122 |

The next encounter with sensed slo results in 20 slo presented at the Integration Memory EDS Because slo is an exact match with the first slo encountered, a regional match fires the EDS with a 456 output which is an experienced valid output association.

Overtime, reinforcement values for a given input will converge on the middle value of the range Learned valid outputs are reusable, (i.e. can be associated with other sensed input) Reinforcement from the environment can be an operator providing positive or negative feedback or sensed data showing that the output is diverging from prior experience (in sensor memory) with that output or inferential reinforcement feedback from other regions

FIG. 12C

SYSTEMS AND METHODS FOR OPERATING A COGNITIVE AUTOMATON

BACKGROUND

The field of the invention relates generally to cognitive processing, and more specifically, to modeling cognitive processing for analyzing an environment.

Human brains are constantly besieged with data about the body and its current state within its environment, as well as sensed environment data, both symbolic and non-symbolic. An intelligent machine does not need most of these inputs. The goal is not to make a machine that thinks like a human, but to make a machine that can sense and store data, relate that data to other sensed and stored data, and infer accurate conclusions. The goal is to ensure that the machine is not encumbered by midbrain distractions and, with modest computing resources and unlimited access to past and current environmental information, the machine will be able to find relationships and correlations to solve problems. The machine needs to be able to interact intelligently with its environment without requiring prior knowledge of that environment.

BRIEF DESCRIPTION

In one aspect, a cognitive analysis (CA) computer device is provided. The CA computer device includes at least one processor in communication with at least one memory. The at least one processor is programmed to receive a set of streaming input data from one or more sensors. The at least one processor is also programmed to divide the set of streaming input data into a plurality of input pathways. Each input pathway of the plurality of input pathways receives an input value from the set of streaming input data. The at least one processor is further programmed to route the set of streaming input data from a plurality of input pathways to a plurality of output pathways based on a context mapping. For each output pathway of the plurality of output pathways, the at least one processor is programmed to combine the received input values to generate an output value for the corresponding output pathway. In addition, the at least one processor is programmed to accumulate output values from a plurality of sets of streaming input data until at least one output value of the plurality of output values on the plurality of output pathways exceeds a predetermined threshold. Moreover, the at least one processor is programmed to compare the plurality of output values to one or more stored sets of data to determine a match.

In another aspect, a cognitive analysis (CA) computer device is provided. The CA computer device includes at least one processor in communication with at least one memory. The at least one processor is programmed to receive a set of streaming input data from one or more sensors. The at least one processor is also programmed to perform spatial abstraction on the set of streaming input data to divide the set of streaming input data into a plurality of input pathways. Each input pathway of the plurality of input pathways receives an input value from the set of streaming input data. The at least one is further programmed to route the set of streaming input data from a plurality of input pathways to a plurality of output pathways based on a context mapping. For each output pathway of the plurality of output pathways, the at least one processor is programmed to perform temporal abstraction on the received input values to generate an output value for the corresponding output pathway by accumulating output values from a plurality of sets of streaming input data until at least one output value of the plurality of output values on the plurality of output pathways exceeds a predetermined threshold. In addition, the at least one processor is programmed to compare the plurality of output values to one or more stored sets of data to determine a match.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof Further, wherever possible, the following description refers to the reference numerals included in the following Figures, in which features depicted in multiple Figures are designated with consistent reference numerals.

There are shown in the drawings arrangements, which are presently discussed, it being understood, however, that the present embodiments are not limited to the precise arrangements and instrumentalities shown, wherein:

FIG. 2 illustrates consolidating the information in the plurality of data planes shown in FIG. 1.

FIG. 3 illustrates the results of consolidation of the data from the plurality of data planes shown in FIG. 1.

FIG. 5 illustrates example table of output values of the first 33 output pathways of the example shown in FIGS. 4A and 4B.

FIG. 7 illustrates a table of values for mapping input pathways to output pathways using spatial/temporal mapping show in FIG. 6.

FIG. 8 illustrates a simple memory match and store in accordance with at least one embodiment.

FIG. 9 illustrates a matching method for full and partial memory matching in accordance with at least one embodiment.

FIGS. 12A, 12B and 12C illustrate an example process for associating new sensed data with already stored input/output associations without having access to the information content in accordance with at least one embodiment.

DETAILED DESCRIPTION

Figure 1:
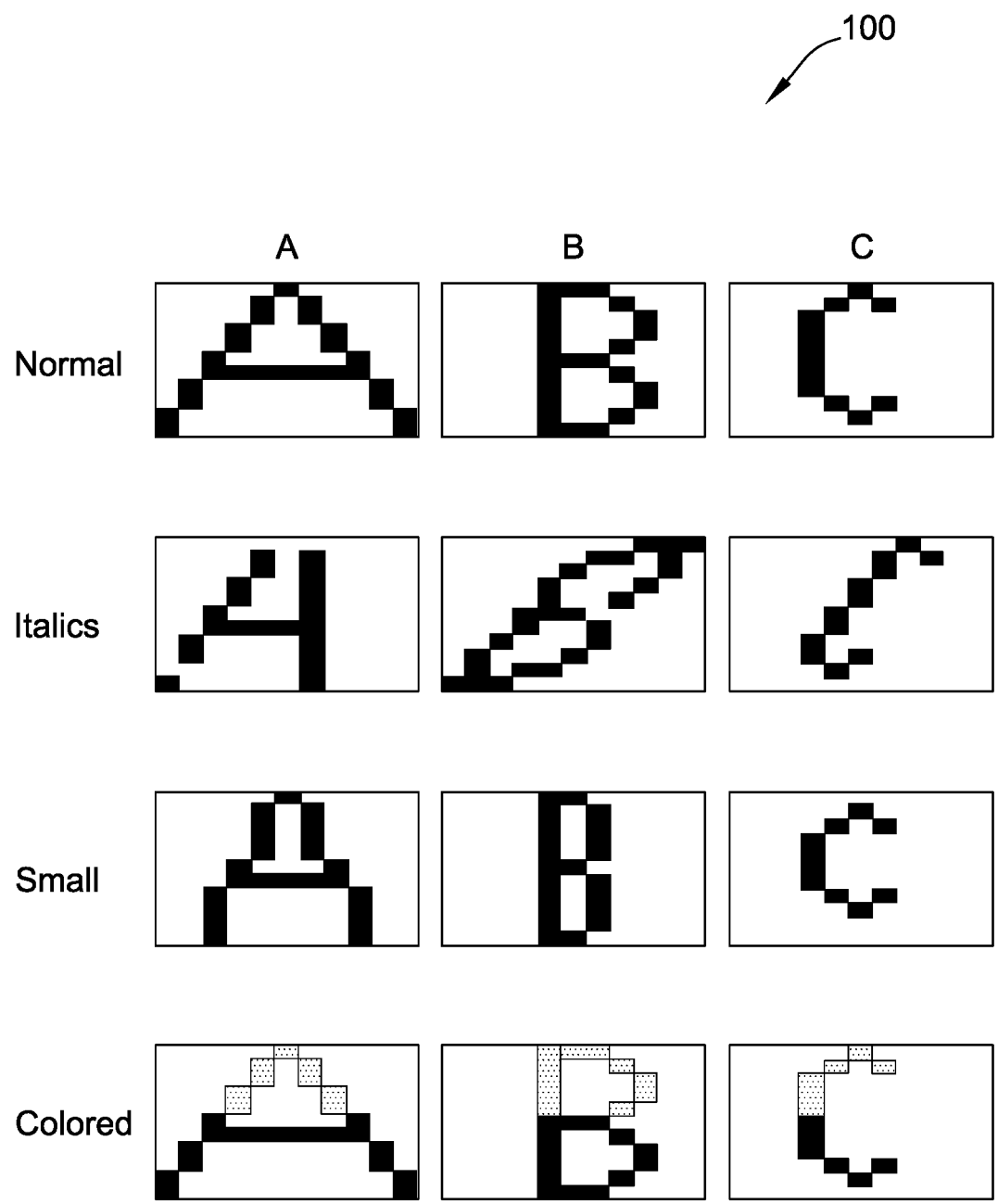
FIG. 1 illustrates a plurality of data planes of sensor information.

The implementations described herein relate to systems and methods for cognitive processing and, more specifically, to modeling cognitive processing for analyzing an environment. To differentiate these systems and methods from the algorithmic and heuristic methods typically used in the current field of Artificial Intelligence, the process of simulating cognitive processing of the human brain will be referred to as cognitive automation. Furthermore, a cognitive automaton ("CA") computer device is provided for modeling cognitive processing. One specific distinction between cognitive automation and artificial intelligence is that artificial intelligence requires prior knowledge of the information being processed, cognitive automation does not. However, the environment of the cognitive automaton needs to provide positive and negative feedback from the environment.

In the cognitive automation model described herein, there are seven functions that are required to instantiate intelligent mechanisms. The seven functions are replicate, layered, and compounded as environmental information is sensed. The environmental information is then reinforced or discarded to establish a cognitive model including symbolic and non-symbolic sections. These seven functions include:

The first function is sensing the environment via arrays of sensor elements. This also includes eliminating background or environmental context information via groupings of sensor data, which reduces the large sensor array into a series of smaller data planes. The minimum required control inputs include positive and negative feedback from the environment and continuous time periods.

The second function is establishing a spatial and temporal context within and between data planes via data defined pathways. This also includes accumulation and rescaling of data values transiting those pathways.

The third function performs context generation for sensor data plane input and output to the environment as well as for the integration of all other sensor and output data to establish a hierarchy of memory regions that are developed from and have pathways from lower level regions.

The fourth function is comparing memory to input and output by region continuously. Memory match qualities are defined algorithmically and provide for matching across an entire region or matching at a foci within a region that satisfies match tolerance criteria. Memory match data meeting quality criteria is conveyed to the next region. Data Planes passing through the spatial abstraction and temporal abstraction stages produces context dependent data.

The fifth function is memory matching using criteria that allows for exact matches across a region, partial matches across a region and inexact matches across a region. The memory matching is performed on the context dependent data produced through the spatial abstraction and temporal abstraction stages.

In the sixth function, the exact matches within the regions are used to generate learned output pathways based on the environment.

Finally, if there are no exact matches in a memory region, the match quality criteria changes automatically to permit inexact matches. This causes a shift from iterative mode to inferential mode. Match quality criteria will automatically change to exact matching if memory match quality improves.

The cognitive automation system described herein learns fundamental information, which is used to determine the best output, advanced information, and advanced output. The system then uses that information to iterate and exchange information with the environment and use that information to infer new information.

Sensing the Environment

There are 120 million rods and 6 million cones in one human eye. This data is coded and multiplexed down to 1.2 million axons in the optic nerve. This exhibits phenomenal consolidation and encoding done by a biological analog system. The processing data equivalent is 1.2 million pathways of all-streaming data at roughly 30 frames per second and a resolution of less than 13 bits. This is achievable with current computers. Cameras and microphones exist today that equal eye and ear sensitivities. Furthermore, equivalent data transport rates are achievable with a little coding or conversion of sensory outputs.

The CA computer device receives input data from sensors that are sensing the environment to be analyzed. This can manifest as sources of digital data, such as, but not limited to, streams of financial data, scientific data, business data, and visual data. For the purposes of analysis, a plurality of data streams of different aspects of the environment are more valuable than a single stream. The CA computer device is programmed to integrate and correlate large sets of input data streams, which are used to generate output streams that may be validated internally or by the environment. This can be envisioned as streams of video data planes (sets of data) rather than a video signal on a cable. The streams of video data planes are then capturing a sequence moving towards a spatial integration stage.

The models described herein are simplifications of the data models used in the disclosure described herein and are meant for descriptive purposes only. They are not meant to be limiting to the scope of the disclosure. The first example starts in FIG. 1.

FIG. 1 illustrates a plurality of data planes 100 of sensor information. Each data plane 100 in FIG. 1 represents a different letter. The columns show different letters and the rows show different fonts applied to those letters. The three columns represent the letters 'A', 'B', and 'C', respectively. The four rows show those letters in normal, italics, small, and colored fonts. Each data plane 100 is at 11 by 11 pixel resolution, so that each data plane 100 consists of 121 pixels. Each black pixel in each letter is represented by the value 100, where each white pixel has a value of 0. In the row of colored letters, the pixel values in the top half, the colored section of each letter are 300. This is not color in the way the human eye senses color, but will be used to demonstrate that shades of black will incorporate into later stages with no loss of differentiation. In the first example, a stream of these symbols, in no particular order, is sensed and consolidated.

FIG. 2 illustrates consolidating the information in the plurality of data planes 100 (shown in FIG. 1). FIG. 2 illustrates a sensor array 200 of the data plane 100 and the corresponding output pathways 205. The sensor array 200 includes 121 pixels. The sensor array 200 shown in FIG. 2 is of the colored letter 'C.' The different values for the pixels are shown in FIG. 200.

As shown in FIG. 2, the values of the different shaded pixels of the sensor array 200 are mapped to the output pathways 205, of which there are 12. In this illustration, there are 121 pixels in the sensor array 200 mapped to 12 pathways 205. The various shaded boxes in the sensory array 200 are 3:1 mappings to the first five of the 12 output pathways 205. The rest of pixels in the sensory array 200 are 6:1, 8:1, or 10:1 mappings to the remaining output pathways 205.

FIG. 3 illustrates the results of consolidation of the data from the plurality of data planes 100 shown in FIG. 1. FIG. 3 illustrates the final values for the output pathways 205 (shown in FIG. 1) for each of the letters shown in FIG. 1.

While each letter is now consolidated, the individual values in each of the output pathways 205 needs to be related to the other values in the other pathways 205, which is called spatial abstraction. For example, the 0 in the top-leftmost pathway of the Normal A has very little meaning unless it is related to the other values in the other pathways 205 in the same data plane 100.

Spatial Abstraction

Spatial abstraction is based on a mapping of input pathways to output pathways with a random distribution then adjusting the distribution mapping according to input data values that have been distributed in a manner (Equal fractional contribution conveyed on each output pathway), which limits the highest data value on the output side from exceeding a scale value threshold. Pathways to more distant or less used output pathways are added to the mapping to further distribute data values that exceed the scale value threshold. This step abstracts individual data elements into a relational spatial context.

There are two separate steps in the disclosed spatial abstraction method: a) initial context mapping and b) adjustments to the context mapping by sensed data in the data stream. Individual data element pathways 205 that comprise a data plane pathway conduct data plane element values from either coded sensory data or other specialized areas to a logical separation in the pathway. To cross this junction, each upstream element creates one or more logical connections with logical elements on the far side of the junction. Initially, the distribution is based on randomly extending pathway connections to nearby elements of the far side of the junction, based on the ability of these elements to accept the connection. The data values from all connections to each downstream element are summed. If the average sum of the inputs exceeds a common threshold over a period of time, upstream pathways will disconnect until the average summed value decreases to within limits. The disconnected pathways will logically extend and reconnect to other downstream elements whose' sums have not exceeded their threshold. Where the average summed value over a period of time does not meet the upper threshold, the logical connection maybe disconnected and the need for the downstream element eliminated. This is illustrated in FIG. 4B.

Figure 4A:
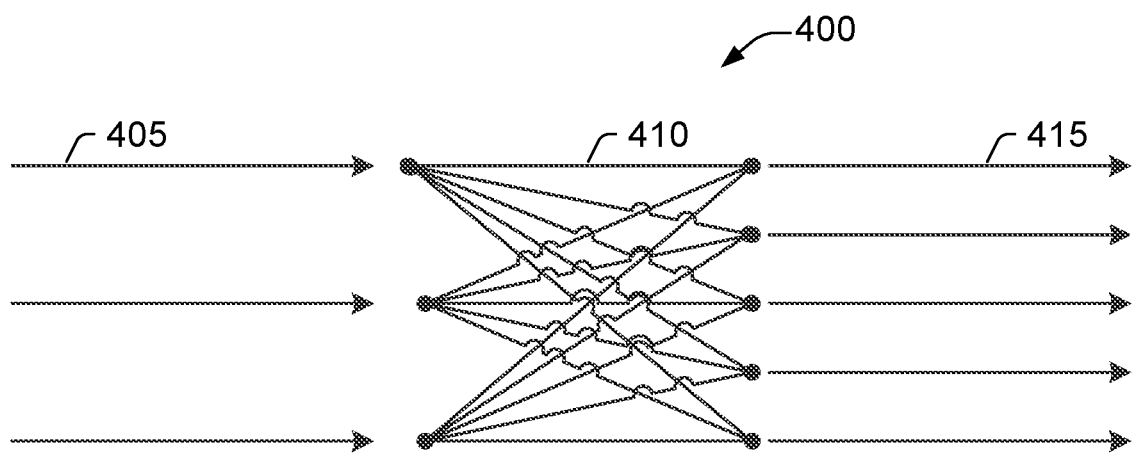
FIG. 4A illustrates an initial context mapping of a plurality of input pathways being mapped to output pathways.
Figure 4B:
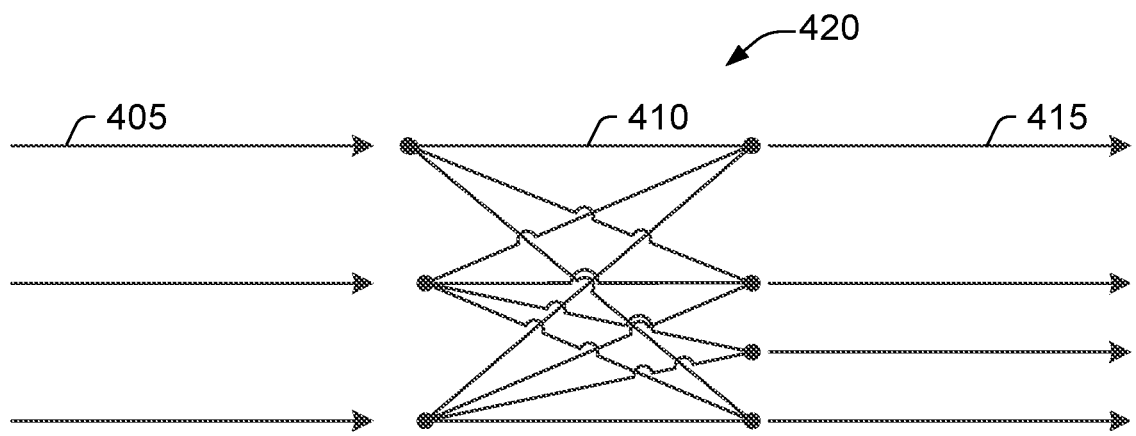
FIG. 4B illustrates the final context mapping of the plurality of input pathways being mapped to the output pathways after the model has been trained.

FIG. 4A illustrates an initial context mapping 410 of a plurality of input pathways 405 being mapped to output pathways 415. The input pathways 405 of FIG. 4 A are the output pathways 205 of FIG. 2. The output pathways 415 are each considered a pathway. And the mappings 410 between the input pathways 405 and the output pathways 415 are considered spatial abstraction junctions.

In the example embodiment, the initial context mapping 410 is a random distribution of the values on the input pathways 405. For example, the value received in the top input pathway 405 is divided by the context mapping 410 into a plurality of values that are each applied to the output pathways 415. For example, if the value on the input pathway is 100, then 20 is applied to each of the five output pathways 415. In at least one embodiment, the value on the input pathway 405 is divided evenly between the output pathways 415 that it is mapped to. The applied values from each of the mapped input pathways 405 are added together to provide the value for the output pathway 415. As seen in FIG. 4A, there are more output pathways 415 than input pathways 405. This is to allow the values from the input pathways 405 to be linked with each other. The number of output pathways 415 is based on the number of input pathways 405, such as in a 10 to 1 ratio, where there are ten output pathways 415 per input pathway 405. The ratio of input pathways to output pathways is relatively influenced by the scalar threshold value described below, but can be defined by the data being sensed.

After the initial mappings 410 are set-up, the CA computer device runs data planes 100 (shown in FIG. 1) through the mappings 410 to train the mappings 410. For example, the normal letter 'A' can be run through the mappings 410 a plurality of times. Each time the CA computer device adjusts the mappings. The goal is to get each of the values on the output pathways to be less than the scalar threshold value, for example, less than 100. Each time a normal letter 'A' is run through the mappings 410; the CA computer device adjusts the mappings 410 to bring them to the goal. When a normal letter 'A' runs through the mappings 410 with none of the output pathways 415 exceeding the scalar threshold value, the training for that letter is complete. As a part of the training, one or more output lines 415 may be determined to not be necessary and removed.

FIG. 4B illustrates the final context mapping 410 of the plurality of input pathways 405 being mapped to the output pathways 415 after the model has been trained. Some of the mappings 410 have been removed and one of the output pathways 415 has been removed as well.

In the example shown in FIGS. 4A and 4B, there is not enough data on the input pathways to warrant or sustain five output pathways, so the second connection is eventually lost. The general rule is that the average amount of data elements flowing across each connection must be one-half of the scalar threshold value. This requirement might not be met on the periphery of the downstream set of connections.

As the sensors are exposed to uncommon symbols in the environment, more signals with higher-than-median values will appear at the junctions. Additional mappings will be created to distribute this added data element values. Eventually, the mappings will no longer be random, but will have a geographical nearness bias and will be information-driven connections.

FIG. 5 illustrates example table 500 of values of the first 33 output pathways 415 (example shown in FIGS. 4A and 4B). The values in the table 500 illustrate the values of each output pathway before and after exposure to A's and C's. The initial distribution values are random values (far left column) from noise input. After repeatedly only sensing A, the distribution connection mappings 410 change and produce the values shown in the "A only" column. After repeatedly sensing A's and C's, the distribution output values become those shown in the "A then C" column. There is little tapering off at the ends of the columns, indicating a clear data-driven demarcation between the represented area and adjacent areas. The noticeably large difference between these two columns is an artifact of the sensor. The C input matrix happens to cover more of the broad area sensors than the A input, resulting in larger values being conveyed on the 12 sensor pathways. Further to the right, the three columns are sorted by values and a differences column is added. The difference between the random distribution and the learned or trained distribution is apparent. The consistency of the data distribution is also evident.

Figure 6:
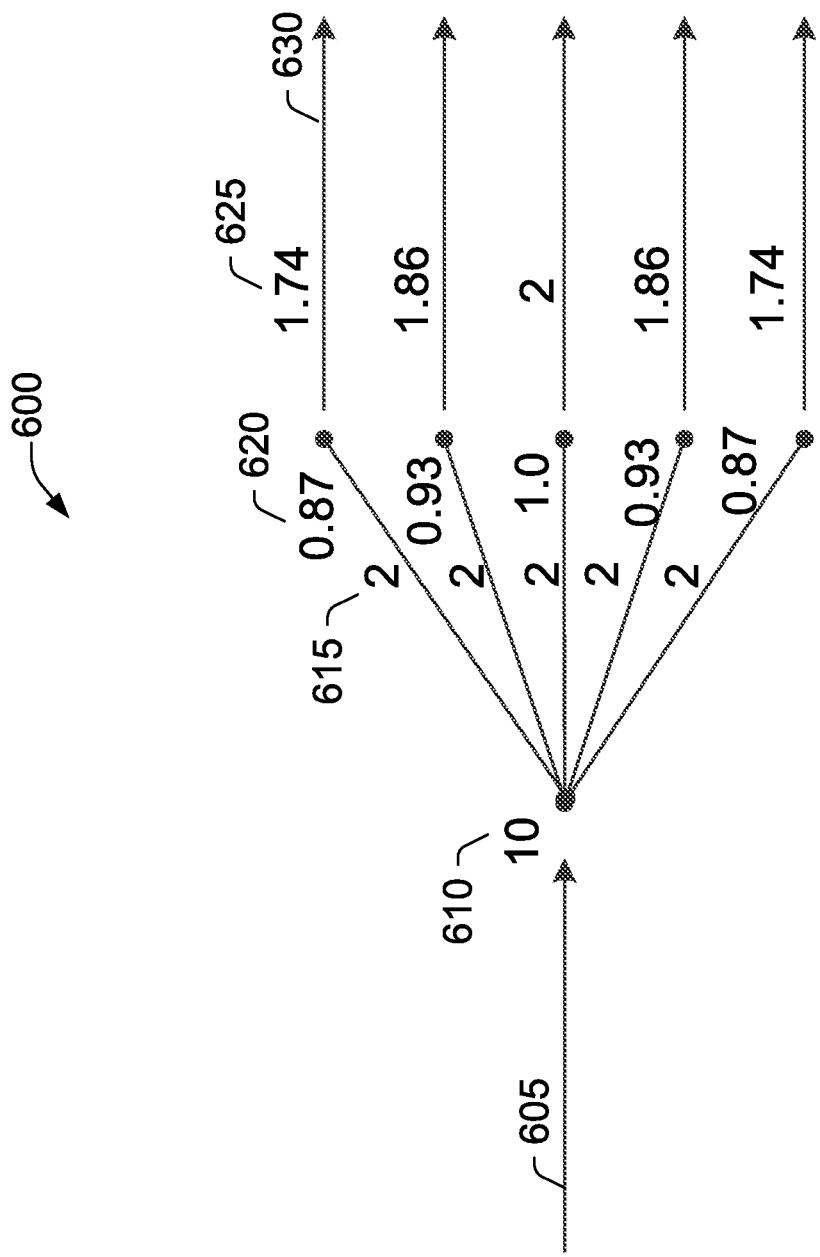
FIG. 6 illustrates a spatial abstraction including a single input pathway that is mapped to a plurality of output pathways.

FIG. 6 illustrates a spatial abstraction including a single input pathway 605 that is mapped to a plurality of output pathways 630. FIG. 6 only shows a single input pathway 605 purely for illustration purposes. In the exemplary embodiment, the 12 output pathways 205 (shown in FIG. 2) are considered input pathways 605. In one embodiment, the 12 input pathways 605 are then mapped to 120 output pathways 630.

As shown in FIG. 6, an input value 610 for the input pathway 605 is 10. Based on the spatial abstraction, that input value 610 is divided evenly across the five output pathways 630 so that each output pathway 630 receives a spatial value 615 of 2.

The CA computer device spatially adjusts the spatial value 615 based on pathway distance. The CA computer device adjusts the spatial value 615 by an adjustment factor 620 relative to the distance from the initial pathway the final pathway is. For example, the center output pathway 630 in FIG. 6 is on the same line as the input pathway 605 and is considered the center. The adjustment factor 620 for the center line is 1. The adjustment factor 620 for the line above and the line below the center line is 0.93. The adjustment factor 620 for the outer lines is 0.87. This adjustment factor 620 is applied to the spatial value 615 to receive the output value 630. So the output values 625 for the 5 output pathways 630 from the input pathway 605 are 1.74, 1.86, 2, 1.86, and 1.74. Each of the output pathways 630 can also receive values from other input pathways 605, so the final output values 625 will be based on adding all of those received values together. The farther away from the source line, the less of the spatial value 615 that is applied to the corresponding output pathway 630.

The output values 625 are accumulated by the output pathways 630. When one of the accumulated output values 625 exceeds a predetermined threshold, the accumulated output values 625 are transmitted on and the cycle restarts again. In some embodiments, a gain control mechanism is applied to each of the output values 625 to delay reaching the predetermined threshold, so that more data planes may be accumulated and connected. In some other embodiments, the predetermined threshold is the scalar threshold value described above.

Temporal Abstraction

Temporal abstraction is an enhancement to spatial abstraction in that data pathways mappings from the input side to the output side are adjusted based on the summing of input values over time. Input values are equally reduced by a gain control mechanism to delay reaching the scale value limit. This step integrates streams of input data planes across time. The Spatial/Temporal abstraction mapping transforms data in input data planes to context dependent data in the output planes. Context dependent means the data is only valid when compared to other data that has been transformed using the same spatial abstraction/temporal abstraction mapping (or the input sensor mapping).

FIG. 7 illustrates a table of values for mapping input pathways to output pathways using spatial/temporal mapping show in FIG. 6. FIG. 7 illustrates the mapping for 9 input pathways to 17 output pathways. The upper section contains the distribution values and the lower section shows the actual data values for each distribution value. The lower right-hand column is the final abstracted output for the three input data planes.

In some embodiments, temporal abstraction can also be achieved by sending the difference between streams of input data and memory data to the next spatial abstraction/temporal abstraction function.

An exalted data stage (EDS) is a computational function at the output of the spatial abstraction/temporal abstraction function that accepts input data planes, compares them to streams of memory data, and sends the differences between the two though other pathways to other spatial abstraction/temporal abstraction function where they accumulate in the temporal abstraction portion of the stage. If a memory match isn't found, the EDS stores in input data plane values in memory.

In FIG. 7, the distance distribution and scale factors simulate a mapping that was created in the spatial abstraction stage as illustrated in FIGS. 4A and 4B. Therefore, FIG. 7 illustrates temporal abstraction as described above. Temporal abstraction does not create a new mapping. It simply accumulates the sum of many data input data planes up to the scale value limit as shown in FIG. 7.

In some other embodiments, temporal abstraction can be performed by accumulating the differences between a stream of data from one or more sensors and a similar stream stored in memory.

Memory Matching

Once the data has been spatially and temporally abstracted, the CA computer device can begin memory matching the data. There are three types of memory matches: exact matches, partial matches, and inexact matches.

The memory matching algorithm compares data values in memory to data values on the input side. Matches can be broad, i.e. that match within a limit across the entire plane, or the matches can be focused, i.e. starting at a small area in the data planes and if the matching progresses outward within a limit, the entire plane is assumed to be a match. An example of a memory matching algorithm is taking the standard deviation of the sum of the difference in data values for the entire data plane. A Standard Deviation range limit defines matching, inexact matching, and non-matching. A partial match uses part of an input and therefore part of an input data plane to match with a previously stored full data plane. If an exact or partial match is not found, the match limit threshold can be expanded until a match is found. This is inexact matching.

FIG. 8 illustrates a simple memory match and store in accordance with at least one embodiment. The input data plane is represented in the shaded column on the left. The stored memory data planes are to the right. The bottom row includes the letter associated with that memory plane for illustration purposes. As the output pathways 630 (shown in FIG. 6) are received, the output values 625 (shown in FIG. 6) are stored. Every time the sensors saw a different letter, the output was stored in the memory. FIG. 8 only shows the bottom 20 output pathways 630 of the 120 output pathways 630 described above. In the example embodiment, all 120 output values 625 are stored for each data plane 100.

Figure 9:
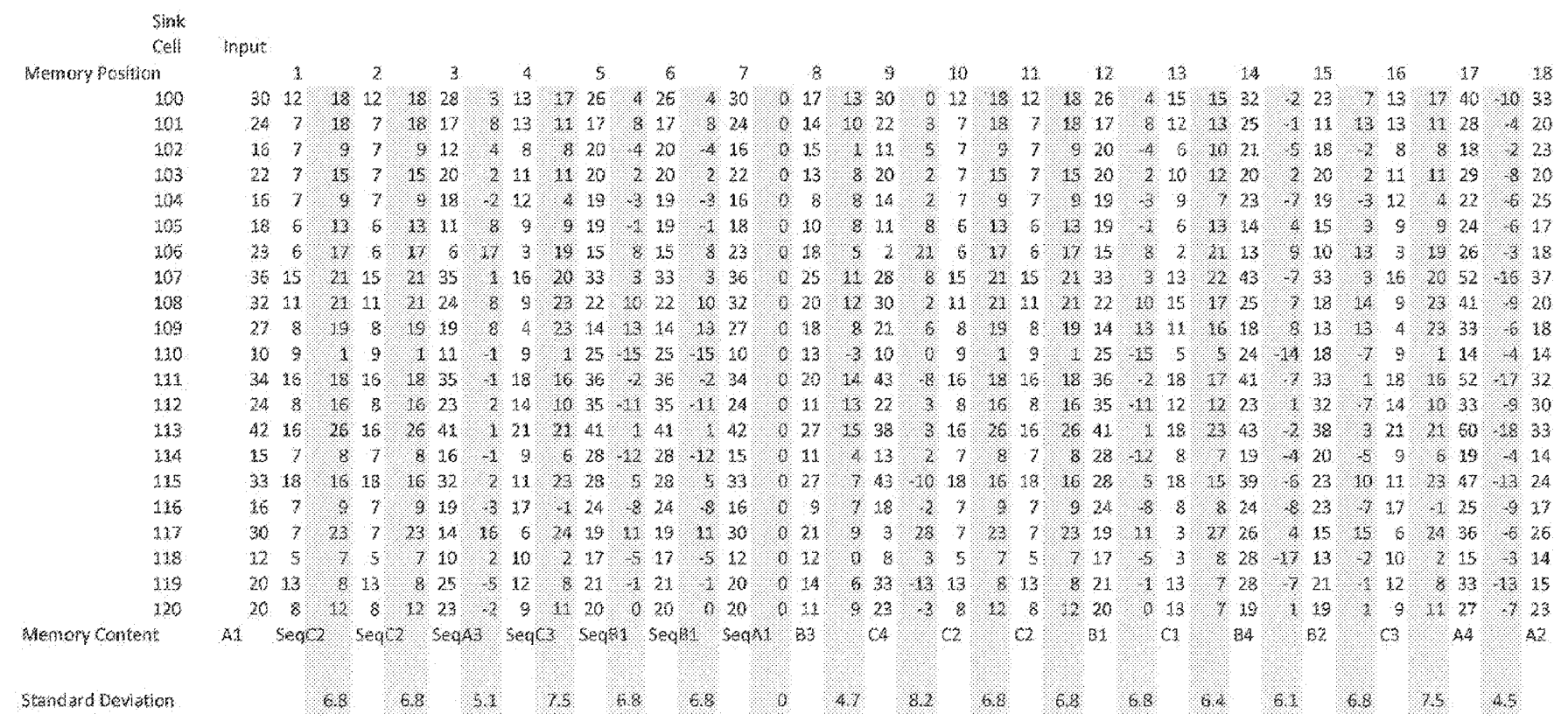

FIG. 9 illustrates a matching method for full and partial memory matching in accordance with at least one embodiment. As shown in FIG. 8, only the bottom 20 rows of input pathways and memory are shown for illustration purposes. In other embodiments, all of the input pathways can be used, or only a predetermined portion or range of pathways can be used. The grey columns are the differences between the input value (the column labeled "Input") and the memory plane to its left. The input values are associated with the sensors sensing a variation 1 letter 'A'.

The number at the bottom of the grey column is the standard deviation of the differences. As seen in FIG. 9, memory plane 7 is an exact match with a standard variation of 0. In some embodiments, any standard deviation below 5.1 is considered to match the input to some degree. This includes the columns for the variations of A. For example, while the input is variation 1, column 3 is variation 3 and has a 5.1 standard deviation; column 17 is variation 4 and has a 4.5 standard deviation, and so on. Column 8 produces a standard deviation of less than 5.1, so it is also a match, but the data in this memory plane encodes variation 3 of B. This illustrates an imperfect or associative match. No other variation of B or C matches the input. This example also illustrates partial matches, in that all of the A versions in memory are matches to input version 1 of A.

These results are just for the bottom 20 output pathways 630. If all of the 120 output pathways 630 and memory elements are used in the computations, B3 would not appear as an inexact match in this example. Improving the resolution of the input sensors will also narrow the range of inexact matches.

Using a standard deviation threshold works well for this example. Other statistical methods could be used instead of measuring the standard deviation of the differences, as would be known to ones having skill in the art. This model uses other variations of regional and specialized area memory matches that permit loci with strong matches to influence or start a cascade of exalted data stage firings. This method allows for inhibiting input from other areas to prevent or delay the firings. Using an incorrect or incomplete memory-matching algorithm in a computer model results in either catatonic behavior or non-useful inferencing, both of which are easily recognized. Corruption of memory competency is harder to detect in learning systems and a little easier in more mature systems with functioning output. Any adjustments of the memory-matching algorithm require restarting the learning process with a known competent memory.

Iteration and Inferencing

Figure 10:
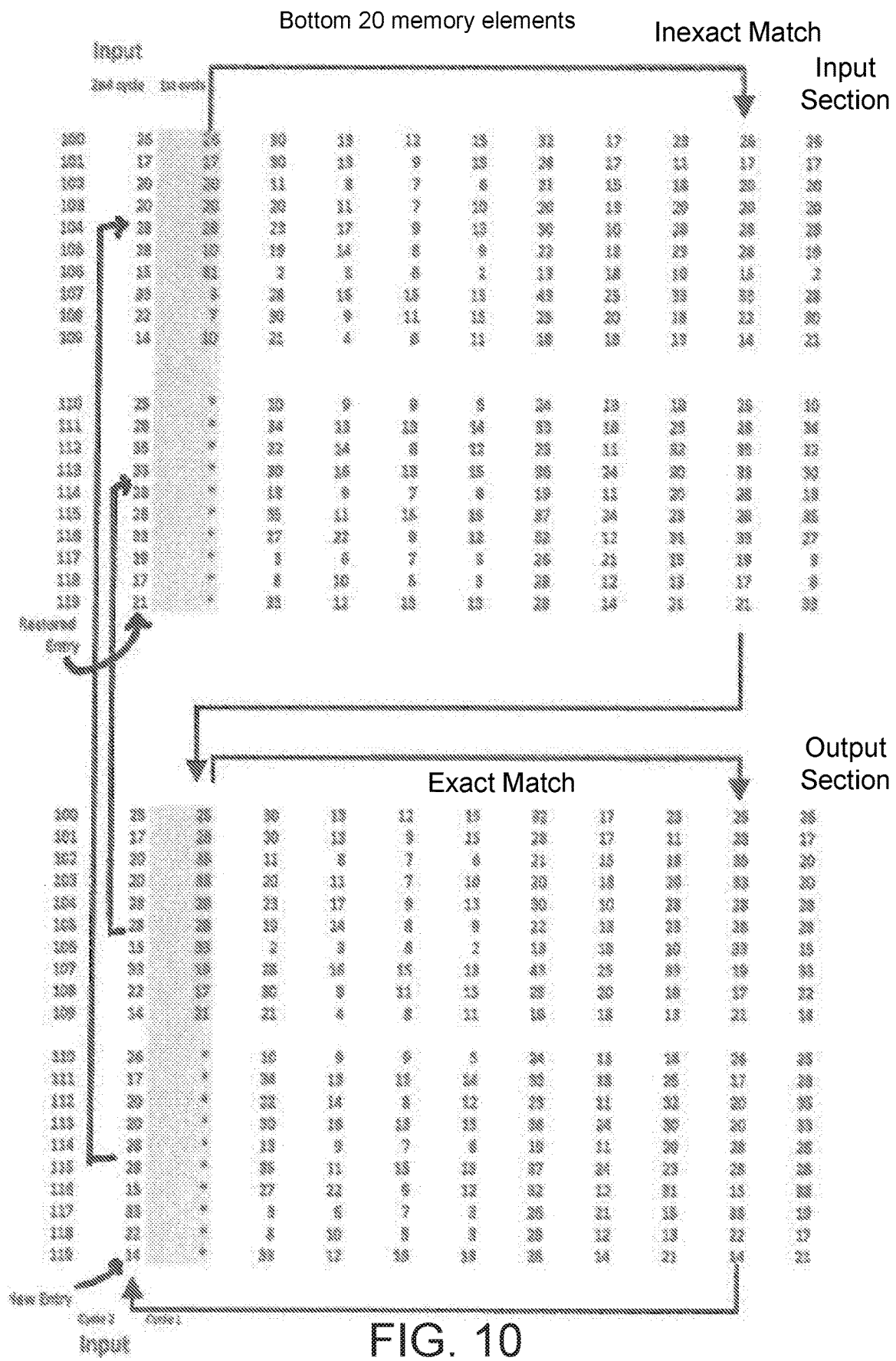
FIG. 10 illustrates inferencing with partial matches to restore faded memory in accordance with at least one embodiment.

FIG. 10 illustrates inferencing with partial matches to restore faded memory in accordance with at least one embodiment. The top 20 rows are part of the input section of memory and the bottom 20 rows are part of the output section. Each of these sections has input columns and output columns (shown in grey). Pathway mapping between sections does not have to be exact. In the input section, the input data for the first cycle is shown in that column. It inexactly matches with memory column 8. The associated output data in that same data plane is conveyed to the input side of the output section, where it exactly matches column 8 of that section. The associated output data plane is conveyed to the input side of the input section or second cycle where, along with the original (grey portion) of the output, it is entered into memory. That memory entry exactly matches memory column 8, where cycle 1 only matches part of it. For the purposes of this discussion, iterative matching is when exact matches occur between the output values and the stored memory. Inferencing, as shown in FIG. 10, occurs when inexact matches are used to attempt to find an exact match.

While FIG. 10 illustrates the match being found in a few steps, the search may take 100 to 1000 cycles. Furthermore, this demonstrates the capability of searching memory to make an inexact match, which can then be used to find an exact match to reconstruct missing memory.

With such an imperfect matching capability, associative inferencing can occur. The output from a specialized area can imperfectly match a data plane in the next specialized area, generating an output that is different, but possibly still valid, for the next inference. The inference thread wanders through memory regions until an output iteratively match the input stream that started the thread.

If there is an explicit goal, it is staged in symbolic memory or in the environment as a visual, audible, or physical goal. Any inferential output is tested in memory through further inferencing, or it is tested in the environment and is either reinforced or not. The system does not have access to such goal information for computing purposes. It can only sense information in the environment and store it in memory for later use.

Figure 11:
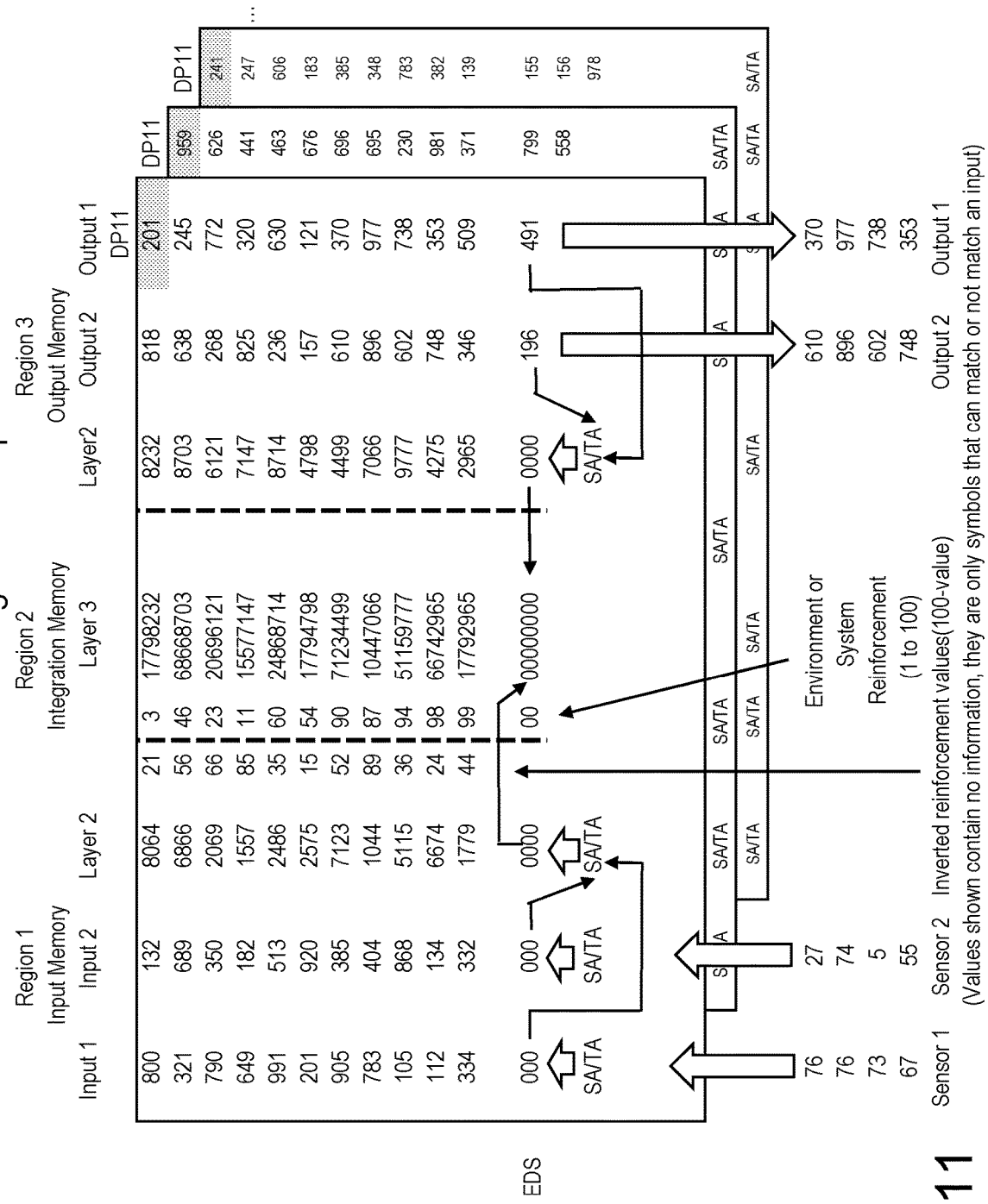
FIG. 11 illustrates an architecture to produce learned associations between input and output in accordance with at least one embodiment.

FIG. 11 illustrates an architecture 1100 to produce learned associations between input and output in accordance with at least one embodiment. The architecture 1100 includes the functions described above. The architecture 1100 can be expanded to include more types of input from both sensors and from other spatially abstract/temporally abstract outputs.

From left to right there are two input sections for sensors, and integration section for those inputs, an input/output integration section, an output integration section for the two output sections and the output data sections. The row of zeros represents the Exalted Data Stage (EDS), where the memory and input arrive. Data rows above them are in memory. Data rows below them are inbound and outbound data. The additional two layers behind the exposed layer represent part of the data planes for each single data value on the exposed layer. The DP11 labels above the numbers with the grey background indicate two additional values that make up that data plane. The ellipsis indicates the rest of the elements that make up DP11, continue into the page. Individual data planes in this representation are not two-dimensional matrices. They are one dimensional and project into the page. (201, 959 and 241 are the first three entries in the right-hand topmost output data plane.) The actual topology of the data planes must minimize connection pathway length in a true analog system. In this numerical model, that is not required.

Each input and output section contains two columns of numbers. The numbers above SA/TA and exalted data stage zeros are memory entries from that SA/TA stage. The input and output integration sections and the overall integration section uses the same representation but with wider data planes. Data flow the following path: sensor to SA/TA, to Input integration, to integration Region 2; and output to SA/TA, to output integration, to integration Region 2. Output data is consolidated just like input data and associated with the input data via the integration layers. Output data flow is not switched. Like input data, it just branches and flows to two places.

Output and Input pathways flow into separate SA/TA and EDSs so that the respective data planes can be counted. This is done by setting the Gain control for temporal abstraction to a low value, so that the sums increase slowly, and sending a regular small value into the abstractor as each data plane enters the input or output pathways. The length of the input data plane streams is a direct measure of the environmental significance of the sensed input. The longer the stream, the less common the sensed information is. The length of the output data plane stream is a direct measure of the validity of that output. Short streams indicate that something in the environment interrupted a longer stream; generally meaning that the short stream did not work or was otherwise not valid in the environment. The stream length is stored with the associated input and output in the Integration Memory in Layer 3.

Data planes flow continually as streams of related data. Input and output streams continue until an environmental change or effect interrupts the stream. The interrupt is signaled by a large increase in value of the TA differences (because matches with memory are now poor) and a firing of the EDS. In general operation, the system will optimize towards longer output streams and shorter input streams.

In operation (FIG. 11), sensor data is presented at the EDS and compared to memory; a match will produce an associated output when the EDS fires or commits data to memory. A lower quality match in any section will cause inferencing to begin.

The number of memory regions is limited only by input and output requirements and implementation hardware. Data plane widths, scale ranges, and memory depths are only limited by the input and output requirements and implementation hardware as well.

In the example embodiment, the system is dynamic, such that it runs continuously. Data is always flowing even if the data is common or routine. Furthermore, the memory scans between each region are asynchronous.

Over time, there is a build-up of duplicate entries in any region. During a separate memory clean-up function, the duplicates are deleted.

Associating Input and Output

In at least one embodiment, the input data planes shown in FIG. 11 flow upward on the left. These data planes are transformed through spatial abstraction/temporal abstraction and compared to the memory at the Exalted Data Stage (EDS). If there is not a match, the data plane is stored as memory entries and sent on the next level spatial abstraction/temporal abstraction in the same region.

The integrated sensor input data is transformed in the next spatial abstraction/temporal abstraction layer and compared to memory. If there is a match, the data is sent to Region 2. If there is not a match, the data is stored and sent to Region 2.

Output data flows downward directly from memory. Instead of transforming in an EDS, those data paths branch with one path leading to whatever output mechanism there is; and the other leading to a Layer 2 spatial abstraction/temporal abstraction transformation where it is compared to output memory entries.

The output will always match something because output memory entries have been validated (invalid entries are deleted because they are not used or reinforced.) The worst case would be a partial or inexact match which could still be valid. They are then entered into memory and that output of the spatial abstraction/temporal abstraction layer is sent to Region 2

The Region 2 spatial abstraction/temporal abstraction is the integration between input and output. The output of that spatial abstraction/temporal abstraction is stored in memory if it is not already there.

Memory scanning in Regions 1, 2 and 3 is not synchronized. Input runs independently of output. Region 2, Integration Memory receives input from Region 1 SA/TA and compares it to Region 2 memory. If a match is found, the associated output index (Context Free Data) is sent to Region 3 where, during Region 3 scanning, it will match exactly with the start of a previously used and stored output stream. That output stream will continue as Region 3 scanning continues. This is illustrated with an arrow directly from Region 2 memory to the column of letters with a "Z" prefix in Region 3 memory, in FIG. 11.

The indices are necessary to synchronize region 2 and 3 data. Separate (Hash like) data generation to provide these indices is not necessary. A portion of a data plane read directly from memory provides sufficient variation to serve as a unique index or hash. Data used in this manner is Context Free Data.

Matching input data planes to Integration Memory data planes will generally be partial matches due to the variation in SA/TA and sensor data. To further ensure the selection of a valid associated output, the input match will also include the stream size, as illustrated by the columns of letters in Region 2 Memory in FIG. 11. The best matches are made with sensed data and stream sizes. The same is true for matches between the Integration and Output regions. Input memory is compared to Integration Memory while Output memory is also compared to Integration memory. If output was interrupted (i.e. that output did not work in the environment) (e.g. the robot walked into a wall), the output memory stream size, stored in Integration memory will be smaller than it should thereby reducing the chances of that output being matched again for that input. After an Integration Memory match, the appropriate output will be initiated and the output memory will continue to send output even though the Integration Memory has desynchronized with the output memory scanning and is only matching sensor data.

This mechanism associates newly sensed input streams with previously associated inputs and outputs. If the newly associated output stream fails, it will not be selected again for the same input. Overtime, successful associations will build up in memory.

Operating with Known Input and Output

Everything on the sensor side and the output side matches memory and is part of the Region 2 input.

Because of the high-quality memory matches, the differences being sent from the region 1 and 3 SA/TA functions are very small. This allows a large number of data planes to be accumulated in the Region 2 spatial abstraction/temporal abstraction function before the scale range limit is reached and a memory comparison is made in Region 2. This mechanism allows the output region 3, to run much faster than region 2 and continue out of synch with Region 1. Eventually, matching in region 2 will fail because sensor input (or more likely, higher level data planes) do not match any memory with a valid and associated output.

Operating with Unknown or New Input

If a memory match fails in Region 2, there is no stored valid output for the sensed input. Region 2 memory will be scanned until the best partial or inexact match is found for the current input. The output memory scan will synch up with Region 2 so the associated best output match will start the output at the correct memory position. This data will be entered into Region 2 memory. There are multiple ways to do this. First, scanning speeds actually change when there are poor data matches. Second, the temporal abstraction sum accumulation is so long that Region 2 memory can do a complete scan before the scale range limit is met and the next data plane is ready for Region 2 matching. Third, Region 2 contains many duplicate entries so scanning duplicates make it appear to be scanning slower.

This is allowed by the spatial abstraction/temporal abstraction and the ability of the CA computer device to make partial and inexact matches with spatial abstraction/temporal abstraction data in memory.

It is also very important to note that spatial abstraction/temporal abstraction relate data elements throughout and between data planes. The new integrated data plane can be used to match other input as a single plane instead of trying to match a stream of data planes on the fly. SA/TA also condenses data considerably.

Memory Control System

The CA computer device follows several rules. First, during memory scanning, each data plane in a region is presented to the EDS in the order it was stored. Memory reading and writing are both sequential, where the most recent sensor event or output event is stored at the beginning of memory. Second, memory scanning and control is independent of EDS firing. Third, memory is scanned continuously. Memory scanning is not resynchronized between regions. Sensor region input to the integration sections results in an input match of varying quality and sends an output to the output region where a match will occur and output made to the environment. This configuration allows different sensor inputs to be associated with different outputs without duplicating output memory. When an output results in feedback from the system or the environment, the data is a separate input to the input region as is associated with the sensor data the caused the output. Delays between input, output and feedback are accommodated.

Iteration and inferencing are effective only by desynchronizing memory section scanning and by data section layouts so that there can be foci for regional matching in several specific regions.

Input and Memory Data differences from the EDS comparators are sensed and tested against a threshold. The threshold can vary based on experience, energy expenditure, or epoch. The best matches will occur in a small area of the data plane, such as a specific specialized area.

The control mechanism senses the output of some or all comparators and, when a set of comparators in close proximity, match within some tolerance, the region's data stage is fired. Tolerance is tight until match rates diminishes. Tolerances are then reduced to increase the match rates and initiate inferencing.

In FIG. 11, memory planes move down towards the EDS while input moves up, for all regions. Memory is scanned continuously. That means output and input are also continuous even though neither may be valid. FIG. 11 illustrates a set of connected functions configured to produce a result. Exact matches produce repeatable learned outputs. If exact matches are not in memory, inexact matches produce inferred results. As illustrated above, the spatial abstraction/temporal abstraction output data makes this possible.

For an EDS firing to occur and generate an output, there could be a cascade of matches beginning at a foci in the integration region. If input and output data have been experienced before and integrated in the integration memory section, the overall matches will be exact, otherwise partial or inexact matches in some area of the region will start a cascade firing. The output sections do not require a memory match (there is nothing to match to.) Output data flows toward the output mechanisms and to the spatial abstraction/temporal abstraction pathways for abstraction and further integration.

The input region and the input integration region data planes are scanned together. The output region and the output integration region data planes are scanned together. The Layer 3 integration layer scanning is desynchronized from the other two regions.

Once the EDS fires, output memory data is conveyed to output pathways as long as the output integration layer continues to match that same output data via the spatial abstraction/temporal abstraction pathways. If that matching fails, output will be restarted by the Integration Region. Since scanning in the three regions is not synchronized, the timing differences can be accommodated changing scan rates, pausing or duplicating entries. This mechanism allows memory output data to flow as output yet still be actively controlled by other memory.

If, for a given input, the memory match in the integration region is poor, inferencing will begin automatically. This is done by reducing the memory matching requirements in the integration section gradually; a little for each complete memory scan. The actual amount will vary by implementation. An inexact input match fires the EDS for the integration region, tying the approximate integration match to an output integration data plane. In layers above layer 1, output data pathways lead to other input integration layers. As an example, a pathway between several different Region 2's as seen in FIG. 11 will permit a looping of data between the regions until matching improves or the loop is interrupted by new sensor input. Each cycle of the loop will result in new data being stored in that regions memory. This is inferencing.

Sets of sensors that produce output on parallel pathways, define layer 1 of the computer data flow model. Cameras and sound sensors are two examples. Any stream of related data represented in matrices will also serve as input. The flow of input data is continuous and memory scanning is continuous.

Each stream of matrices is conveyed to a spatial abstraction/temporal abstraction stage. The spatial abstraction/temporal abstraction output data are stored in memory in the sequence that they are conveyed to that stage. Output of those stages are conveyed to a next layer integration set of spatial abstraction/temporal abstraction stages. Other environmental data such as reward and punishment, environmental time, and energy expenditure, if applicable are also conveyed to the initial spatial abstraction/temporal abstraction stages. Output is a stream of matrices that provide visual, audible or mechanical results to the users. Earlier illustrations include examples of input and output matrices. The memory column contains sensor, integration, and output memory.

Figure 12A:
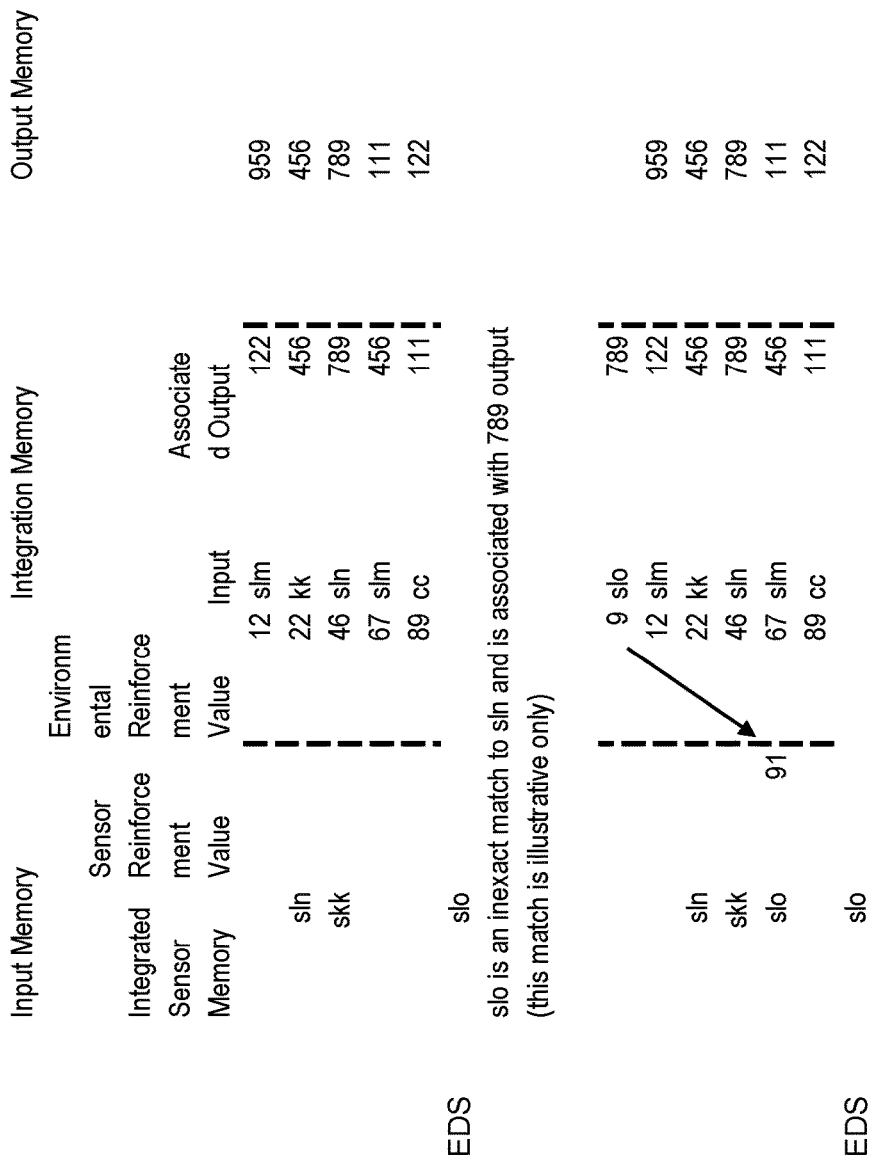

FIGS. 12A, 12B and 12C illustrate an example process for associating new sensed data with already stored input/output associations without having access to the information content in accordance with at least one embodiment.

Input, Integration, and Output Memory regions are shown. Integration Memory also contains the direct inputs for reinforcement from the environment or other regions as seen in FIG. 11. Input Memory also contains the direct but inverted inputs for reinforcement from the environment or other regions as seen in FIG. 11. Inversion is the actual reinforcement value subtracted from the reinforcement value upper limit, e.g. 100−12=88

Memory is scanned from the bottom up. Input is abbreviated for clarity. Only Input Memory and Reinforcement are shown with the input of interest appearing in the EDS row.

The Integration Memory contains pairs of inputs and associated output that have been shown to be of some value when tried in the past. The reinforcement values associated with each associated pair determines that pairs location in memory. In this example, low values are at the distal end and high values are nearest the EDS. Associated outputs always match a value in Output Memory. In this example, there are some output memory values that are not used and there out output memory values are used twice.

In operations, an input of slo is presented in the EDS from the sensors Spatial and Temporal abstractors. There is no Sensor Reinforcement Value since slo has not been sensed prior. Starting from the bottom of Integration Memory Input column, slo is an inexact match with sln, (Inexact matches were illustrated above and this example match is illustrative only). The output associated with sln is 789 which is tried but get a low reinforcement value, 9 from the environment.

(An operator or sensor system interrupted the output because it was ineffective. Output from another Region can also provide such feedback.)

Integration Memory EDS fires, storing the association and reinforcement value. The Sensor Memory EDS fires, storing the sensor input with the inverse of the reinforcement value. (slo 91).

In the next encounter with slo, FIG. 12B, the stored values of slo and 91 are presented to the EDS. Because the first inexact match, slm, has a high reinforcement value 67, it provides the best overall inexact match to the input. The output value of 456 is tried and the environment provides a reinforcement value of 80 meaning the output of 456 provide a good result for the slo input.

The Integration EDS fires storing the 80 slo 456 tuple at the EDS end of memory because the reinforcement value is high. 20 and slo are stored when the Input Memory EDS fires.

The delays between sensing input, making associations, trying an output and receiving reinforcement are accommodated by buffering, temporal abstraction or making duplicate entries.

FIG. 12C illustrates the next encounter with a slo input. The values slo and 20 are the first encounter in memory and are presented at the Integration Memory EDS where slo is an exact match with the first entry in memory. The exact match causes the regional firing, restoring the data in memory and sending the validated output, 456 to output memory.

Overtime, reinforcement values will converge towards the center value of the range. This allows high and low reinforcement values to further improve or disprove associations that have already been validated.

This example construct also allows initial output values to be random and the above described mechanism will eventually select output values that have been reinforced by something in the environment.

Figure 13:
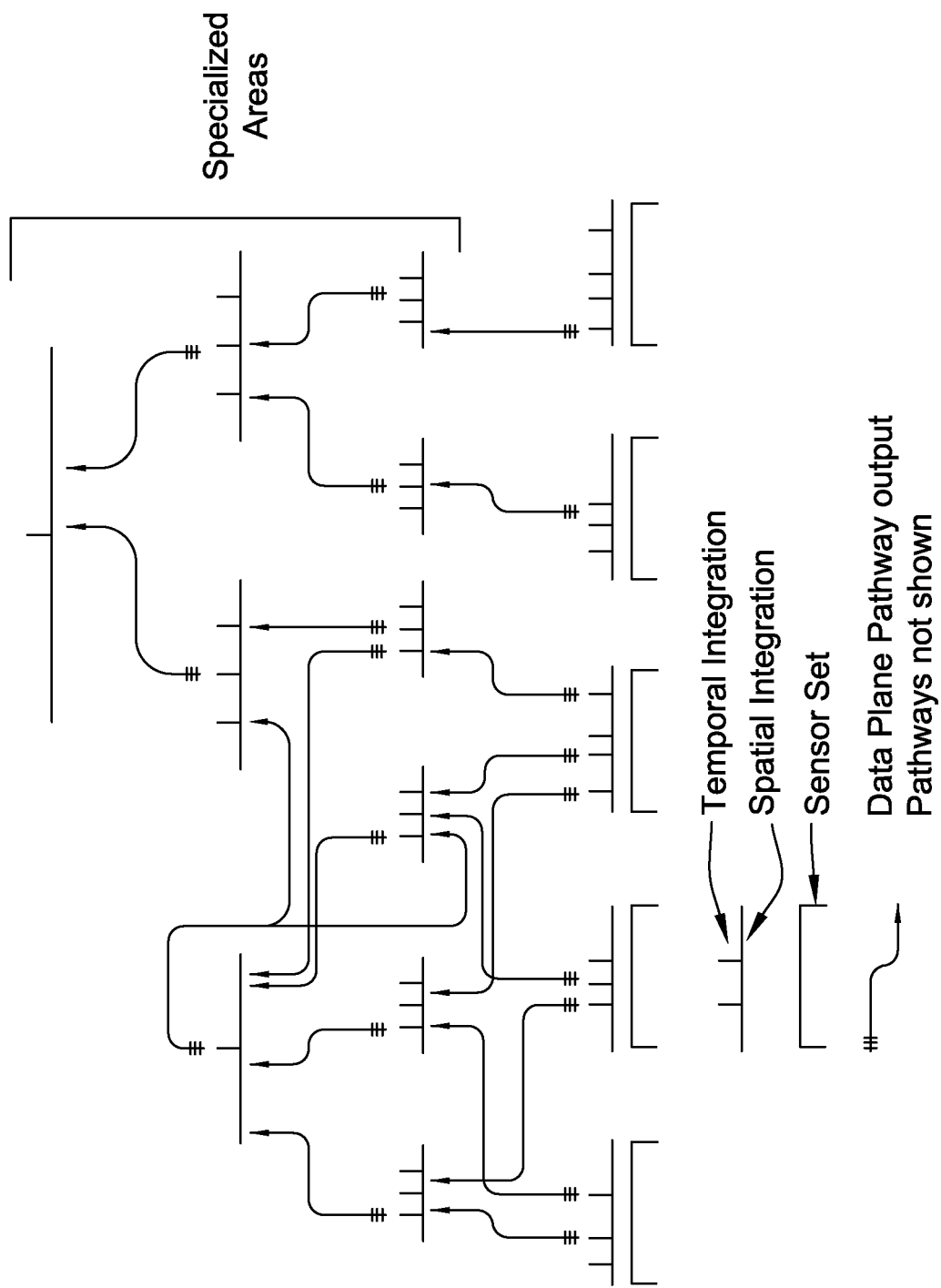
FIG. 13 illustrates an example construct that can be compounded with other similar constructs.

FIG. 13 illustrates an example construct that can be compounded with other similar constructs. This allows very high levels of abstraction while maintaining the ability to validate outputs are each lower level.

Inferencing works in a manner similar to the iteration method shown above, except partial or inexact matches will provide alternative paths among regions to reach a conclusion or output.

FIG. 13 illustrates data paths within and among the symbolic and non-symbolic sections. The symbolic area is represented on the left side of the drawing. Also shown are higher-level layers of specialized areas that have been created with data from input and other specialized areas. The higher-level layers cannot be created until the lower levels are working. The higher-level layers contain summarized information, with the top level containing non-symbolic behavior data that is general and persistent.

Sensor data is spatially and temporally abstracted, and the results are sent to the next layer for spatial and temporal abstraction and storage in a specialized area. At each layer above Layer 1, data from other sensors or specialized areas are included in spatial and temporal abstraction.

The layers above Layer 1 deal only with relational context data. If the data represents something specific that exists and persists in the environment, it is symbolic data and is processed separately from non-symbolic data. Symbolic data requires the very accurate matching of data planes to memory planes to avoid ambiguities. Non-symbolic data can be very rich in information content, and yet imperfect or partial matches with non-symbolic memory data are just as effective, sometimes even producing better results than exact matches.

The information in data planes traversing pathway bundles is stored in memory planes. Data planes leaving Layer 1 are condensed during abstraction. Layers 2 and above spatially and temporally abstract data on pathways from lower-layer outputs and store them in memory. At the top layer, all sensed data is combined in memory planes that represent general valid behaviors. The top layer is non-symbolic. In a lower layer, symbolic data is integrated (abstracted) into non-symbolic data.

Figure 14:
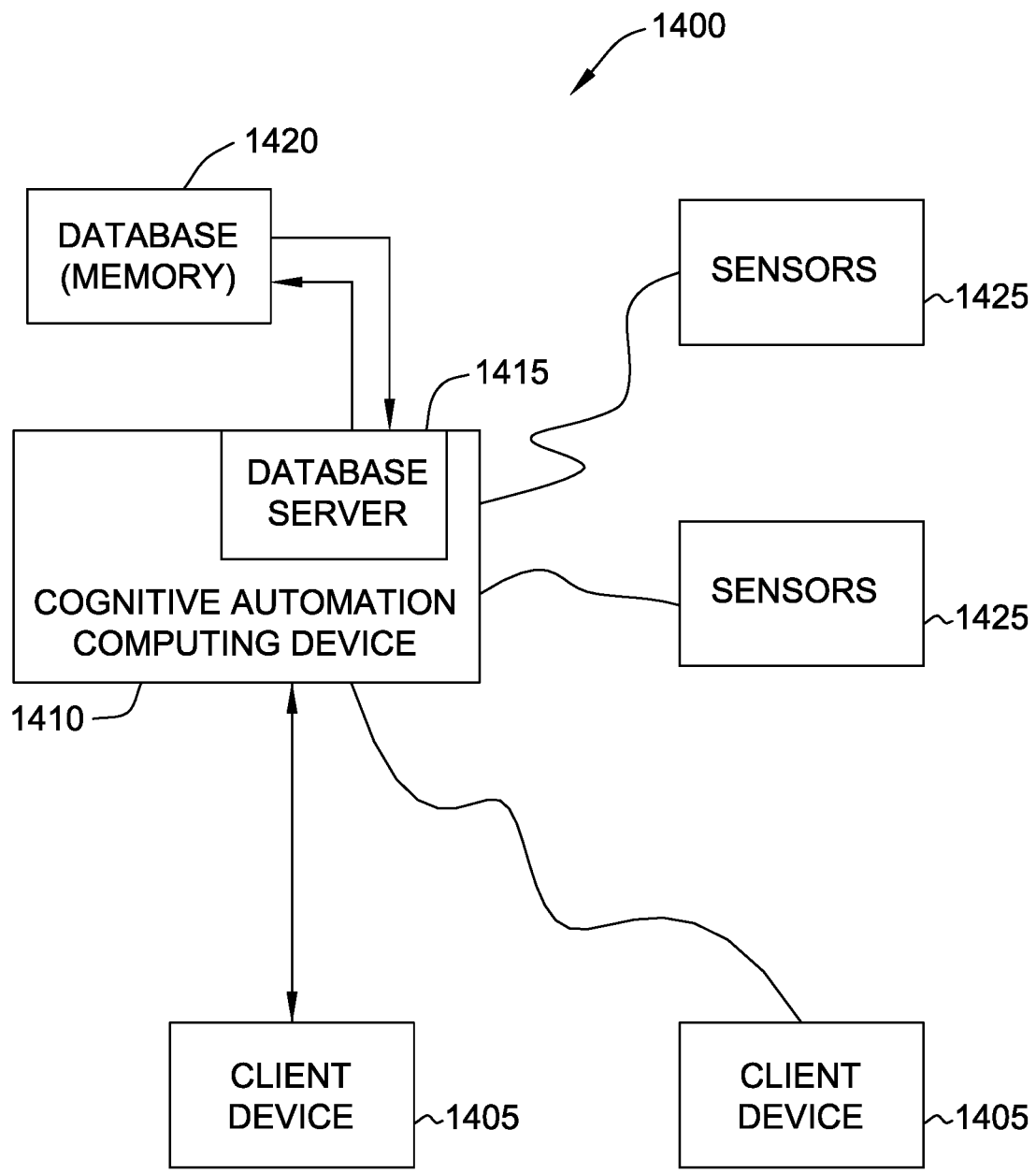
FIG. 14 illustrates a block diagram of a system for cognitive automation, in accordance with one embodiment of the present disclosure.

FIG. 14 is a simplified block diagram of an example system 1400 for cognitive automation, in accordance with one embodiment of the present disclosure. In the example, the system 1400 is used for cognitive automation as described herein. The system 1400 includes a cognitive automaton (CA) computer device 1410 configured to perform analysis on data received from one or more sensors 1425 or one or more client devices 1405.

In system 1400, sensors 1425 measure attributes to be analyzed. For example, the sensors 1425 can receive visual data, sound data, and/or any other type of data. The sensors 1425 can be a collection of different types of sensors configured to collect, for example, but not limited to, visual and sound data simultaneously. Sensors 1425 connect to CA computer device 1410 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensors 1425 receive data and report those conditions to CA computer device 1410. In other examples, sensors 1425 are in communication with one or more client devices 1405.

In the example embodiment, client devices 1405 are computers that include a web browser or a software application, which enables client devices 1405 to communicate with CA computer device 1410 using the Internet, a local area network (LAN), or a wide area network (WAN). In some examples, the client devices 1405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client devices 1405 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one example, one or more client devices 1405 are capable of providing data planes to the CA computer device 1410, such as financial data. In another example, the client device 1405 provides real-time information, such as current financial news to the CA computer device 1410.

A database server 1415 is communicatively coupled to a database 1420 that stores data. In one example, the database 1420 is a database that includes a plurality of input and output memory, mappings 410 (shown in FIG. 4), and other data as described herein. In some examples, the database 1420 is stored remotely from the CA computer device 1410. In some examples, the database 1420 is decentralized. In the example, a person can access the database 1420 via the client devices 1425 by logging onto CA computer device 1410.

The CA computer device 1410 is programmed to perform the cognitive automation as described herein. In some embodiments, CA computer device 1410 is a plurality of computer devices in communication with each other.

Figure 15:
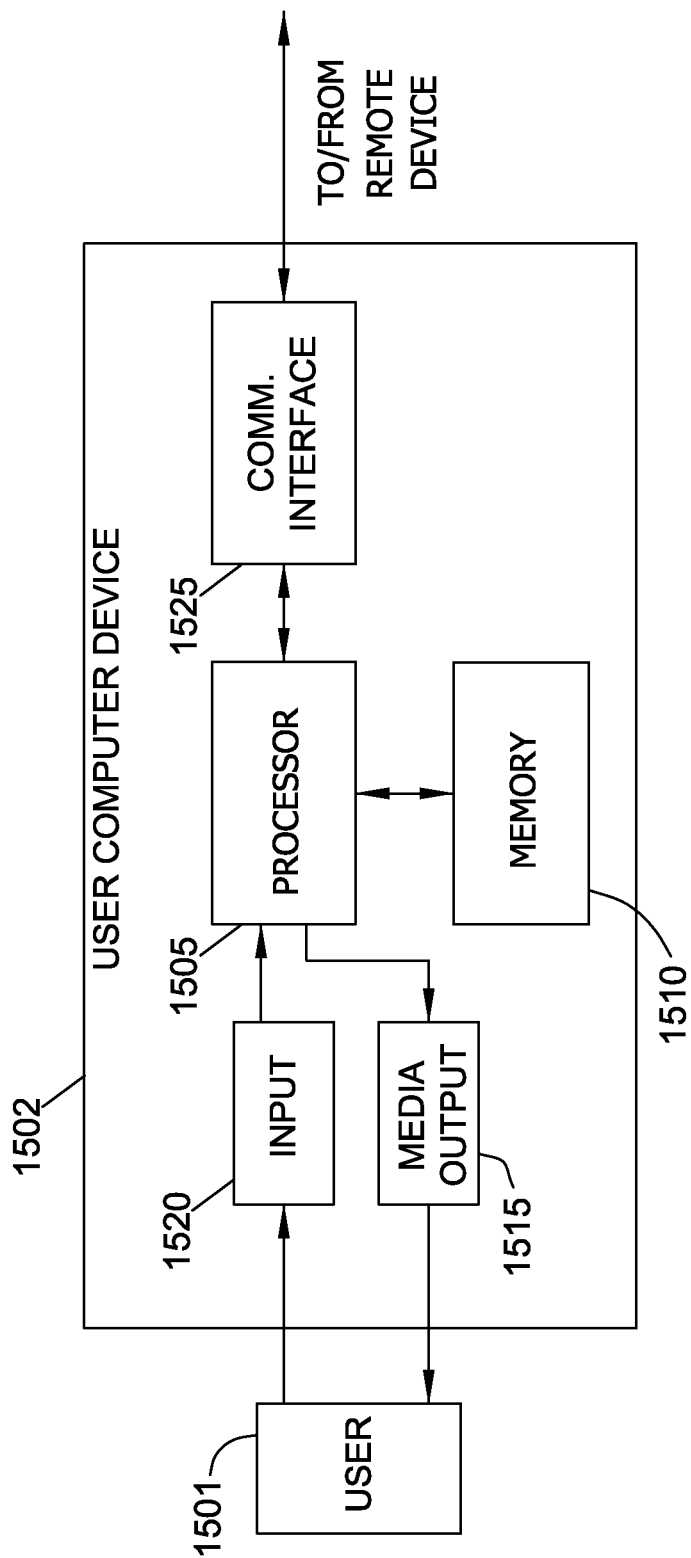
FIG. 15 illustrates an example configuration of a user computer device used in the CA system shown in FIG. 14, in accordance with one example of the present disclosure.

FIG. 15 illustrates an example configuration of a user computer device 1502 used in the CA system 1400 (shown in FIG. 14), in accordance with one example of the present disclosure. User computer device 1502 is operated by a user 1501. The user computer device 1502 can include, but is not limited to, the client device 1405 and sensors 1425 (both shown in FIG. 14). The user computer device 1502 includes a processor 1505 for executing instructions. In some examples, executable instructions are stored in a memory area 1510. The processor 1505 can include one or more processing units (e.g., in a multi-core configuration). The memory area 1510 is any device allowing information such as executable instructions and/or transaction data to be stored and retrieved. The memory area 1510 can include one or more computer-readable media.

The user computer device 1502 also includes at least one media output component 1515 for presenting information to the user 1501. The media output component 1515 is any component capable of conveying information to the user 1501. In some examples, the media output component 1515 includes an output adapter (not shown) such as a video adapter and/or an audio adapter. An output adapter is operatively coupled to the processor 1505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 1515 is configured to present a graphical user interface (e.g., a web browser and/or a client application) to the user 1501. A graphical user interface can include, for example, an interface for viewing the output information. In some examples, the user computer device 1502 includes an input device 1520 for receiving input from the user 1501. The user 1501 can use the input device 1520 to, without limitation, select an input stream to analyze. The input device 1520 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 1515 and the input device 1520.

The user computer device 1502 can also include a communication interface 1525, communicatively coupled to a remote device such as CA computer device 1410 (shown in FIG. 14). The communication interface 1525 can include, for example, a wired or wireless network adapter and/or a wireless data transceiver for use with a mobile telecommunications network.

Stored in the memory area 1510 are, for example, computer-readable instructions for providing a user interface to the user 1501 via the media output component 1515 and, optionally, receiving and processing input from the input device 1520. A user interface can include, among other possibilities, a web browser and/or a client application. Web browsers enable users, such as the user 1501, to display and interact with media and other information typically embedded on a web page or a website from the CA computer device 1410. A client application allows the user 1501 to interact with, for example, the CA computer device 1410. For example, instructions can be stored by a cloud service, and the output of the execution of the instructions sent to the media output component 1515.

The processor 1505 executes computer-executable instructions for implementing aspects of the disclosure.

Figure 16:
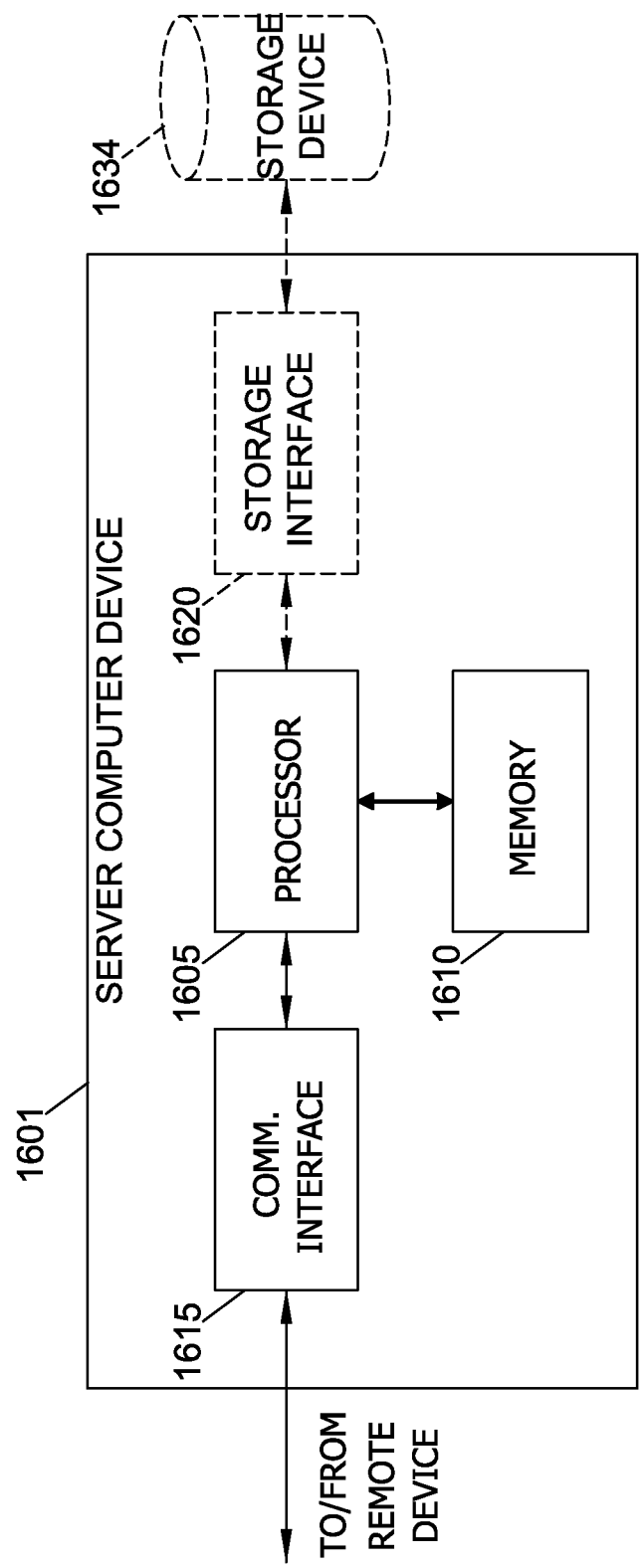
FIG. 16 illustrates an example configuration of a server computer device used in the CA system shown in FIG. 14, in accordance with one example of the present disclosure.

FIG. 16 illustrates an example configuration of a server computer device 1601 used in the CA system 1400 (shown in FIG. 14), in accordance with one example of the present disclosure. Server computer device 1601 can include, but is not limited to, the CA computer device 1410 and the database server 1415 (both shown in FIG. 1). The server computer device 1601 also includes a processor 1605 for executing instructions. Instructions can be stored in a memory area 1610. The processor 1605 can include one or more processing units (e.g., in a multi-core configuration).

The processor 1605 is operatively coupled to a communication interface 1615 such that the server computer device 1601 is capable of communicating with a remote device such as another server computer device 1601, another CA computer device 1410, or the client device 1405 (shown in FIG. 14). For example, the communication interface 1615 can receive requests from the client device 1405 via the Internet, as illustrated in FIG. 14.

The processor 1605 can also be operatively coupled to a storage device 1634. The storage device 1634 is any computer-operated hardware suitable for storing and/or retrieving data, such as, but not limited to, data associated with the database 1420 (shown in FIG. 14). In some examples, the storage device 1634 is integrated in the server computer device 1601. For example, the server computer device 1601 can include one or more hard disk drives as the storage device 1634. In other examples, the storage device 1634 is external to the server computer device 1601 and can be accessed by a plurality of server computer devices 1601. For example, the storage device 1634 can include a storage area network (SAN), a network attached storage (NAS) system, and/or multiple storage units such as hard disks and/or solid state disks in a redundant array of inexpensive disks (RAID) configuration.

In some examples, the processor 1605 is operatively coupled to the storage device 1634 via a storage interface 1620. The storage interface 1620 is any component capable of providing the processor 1605 with access to the storage device 1634. The storage interface 1620 can include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1605 with access to the storage device 1634.

The processor 1605 executes computer-executable instructions for implementing aspects of the disclosure. In some examples, the processor 1605 is transformed into a special purpose microprocessor by executing computer-executable instructions or by otherwise being programmed.

In at least one embodiment, the CA computer device 1410 receives a set of streaming input data from one or more sensors 1425. The CA computer device 1410 divides the set of streaming input data into a plurality of input pathways 605. Each input pathway 605 of the plurality of input pathways 605 receives an input value 610 from the set of streaming input data. The CA computer device 1410 routes the set of streaming input data 610 from a plurality of input pathways 605 to a plurality of output pathways 630 based on a context mapping. For each output pathway 630 of the plurality of output pathways 630, the CA computer device 1410 combines the received input values 610 to generate an output value 6.25 for the corresponding output pathway 630. The CA computer device 1410 accumulate output values 625 from a plurality of sets of streaming data until at least one output value 625 of the plurality of output values 625 on the plurality of output pathways 630 exceeds a predetermined threshold. The CA computer device 1410 compare the plurality of output values 625 to one or more stored sets of data to determine a match. In some embodiments, the match is one of an inexact match and an exact match.

The CA computer device 1410 generates an initial context mapping of the plurality of input pathways 605 to a plurality of output pathways 630. The CA computer device 1410 adjusts the initial context mapping based on a plurality of historical data. The CA computer device 1410 determines the context mapping for the plurality of input pathways 605 to the plurality of output pathways 630 based on the adjusted initial context mapping. The CA computer device 1410 adjusts the initial context mapping to ensure that none of the output values 625 on the plurality of output pathways 630 exceeds the predetermined threshold. The CA computer device 1410 distributes each input pathway 605 to a set of output pathways 630.

In some embodiments, the one or more sensors 1425 are receiving image data. In these embodiments, the plurality of input pathways 605 each map to a pixel of the received image data. In other embodiments, the one or more sensors 1425 are receiving streams of at least one of sound, vibration, stock market values, and financial values.

For each input pathway 605 of the plurality of input pathways 605, the CA computer device 1410 receives an input value 610 for the corresponding input pathway 605. The CA computer device 1410 divides the input value 610 based on a number of output pathways 630 associated with the input pathway 605 based on the context mapping. Each output pathway 630 receives a portion of the input value 610. The CA computer device 1410 divides the input value 610 evenly between the plurality of output pathways 630. The CA computer device 1410 calculates the output value 625 for the output pathway 630 by reducing the assigned portion of the input value 610 based on a distance between the input pathway 605 and the corresponding output pathway 630. The CA computer device 1410 calculates the output value 625 for the output pathway 630 by receiving a plurality of portions of input values 610 from a connected plurality of input pathways 605. The CA computer device 1410 combining the plurality of portions of input values 610 to generate an output value 625 for that output pathway 630.

In some embodiments, each set of streaming input data represents a data plane 100. The CA computer device 1410 compares a first input data plane 100 to a first output data plane 100. If there is a match, the CA computer device 1410 associates the first input data plane 100 with the first output data plane 100. The CA computer device 1410 stores the first association in the at least one memory device 1610. The CA computer device 1410 compares a second input data plane 100 and a second output data plane 100 to a plurality of stored associations. If there is a match, the CA computer device 1410 associates the second input data plane 100 with the second output data plane 100. The CA computer device 1410 stores the second association between the second input data plane 100 and the second output data plane 100. The CA computer device 1410 determines a reinforcement value for the first association. The CA computer device 1410 stores the reinforcement value with the first association. The CA computer device 1410 detects a subsequent association that matches the stored first association. The CA computer device 1410 updates the reinforcement value.

In some embodiments, the CA computer device 1410, receive a set of streaming input data from one or more sensors. The CA computer device 1410 performs spatial abstraction on the set of streaming input data to divide the set of streaming input data into a plurality of input pathways 605. Each input pathway 605 of the plurality of input pathways 605 receives an input value 610 from the set of streaming input data. The CA computer device 1410 routes the set of streaming input data from a plurality of input pathways 605 to a plurality of output pathways 630 based on a context mapping. For each output pathway 630 of the plurality of output pathways 630, the CA computer device 1410 performs temporal abstraction on the received input values 610 to generate an output value 625 for the corresponding output pathway 630 by accumulating output values 625 from a plurality of sets of streaming data until at least one output value 625 of the plurality of output values 625 on the plurality of output pathways 630 exceeds a predetermined threshold. The CA computer device 1410 compares the plurality of output values 625 to one or more stored sets of data to determine a match.

The CA computer device 1410 performs iterative matching when comparing the plurality of output values 625 to one or more store sets of data to detect an exact match. The CA computer device 1410 determines that there is no exact match between the plurality of output values 625 to one or more store sets of data. The CA computer device 1410 performs inferencing to detect an inexact match. The CA computer device 1410 performs inferencing to iteratively create inexact matches to identify an exact match for the plurality of output values 625.

Described herein are computer systems such as the CA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.;

Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) providing advanced machine learning techniques; (ii) reducing required training time for artificial intelligence; (iii) mimicking the manner that the human brain recognizes objects; (iv) recreating lost or corrupted memory; and (v) accurate object recognition; and (vi) efficient object recognition.

The methods and systems described herein may be implemented using computer programming or engineering techniques including computer software, firmware, hardware, or any combination or subset thereof, wherein the technical effects may be achieved by performing at least one of the following steps: a) receive a set of streaming input data from one or more sensors; b) divide the set of streaming input data into a plurality of input pathways, wherein each input pathway of the plurality of input pathways receives an input value from the set of streaming input data; c) route the set of streaming input data from a plurality of input pathways to a plurality of output pathways based on a context mapping; d) for each output pathway of the plurality of output pathways, combine the received input values to generate an output value for the corresponding output pathway; e) accumulate output values from a plurality of sets of streaming data until at least one output value of the plurality of output values on the plurality of output pathways exceeds a predetermined threshold; f) compare the plurality of output values to one or more stored sets of data to determine a match, wherein the match is one of an inexact match and an exact match; g) generate an initial context mapping of the plurality of input pathways to a plurality of output pathways; h) adjust the initial context mapping based on a plurality of historical data; i) determine the context mapping for the plurality of input pathways to the plurality of output pathways based on the adjusted initial context mapping; j) adjust the initial context mapping to ensure that none of the output values on the plurality of output pathways exceeds the predetermined threshold; k) distribute each input pathway to a set of output pathways; l) for each input pathway of the plurality of input pathways, receive an input value for the corresponding input pathway; m) divide the input value based on a number of output pathways associated with the input pathway based on the context mapping, wherein each output pathway receives a portion of the input value; o) divide the input value evenly between the plurality of output pathways; p) calculate the output value for the output pathway by reducing the assigned portion of the input value based on a distance between the input pathway and the corresponding output pathway; q) calculate the output value for the output pathway by receiving a plurality of portions of input values from a connected plurality of input pathways; r) combine the plurality of portions of input values to generate an output value for that output pathway; s) compare a first input data plane to a first output data plane, wherein each set of streaming input data represents a data plane; t) if there is a match, associate the first input data plane with the first output data plane; u) store the first association in the at least one memory device; v) compare a second input data plane and a second output data plane to a plurality of stored associations; w) if there is a match, associate the second input data plane with the second output data plane; x) store the second association between the second input data plane and the second output data plane; y) determine a reinforcement value for the first association; z) store the reinforcement value with the first association; aa) detect a subsequent association that matches the stored first association; and bb) update the reinforcement value.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cognitive analysis (CA) computer device comprising at least one processor in communication with at least one memory device, wherein the at least one processor is programmed to:
   generate an initial context mapping of a plurality of input pathways to a plurality of output pathways;
   adjust the initial context mapping based on a plurality of historical data; and
   determine a context mapping for the plurality of input pathways to the plurality of output pathways based on the adjusted initial context mapping;
   receive a set of streaming input data from one or more sensors;
   divide the set of streaming input data into the plurality of input pathways, wherein each input pathway of the plurality of input pathways receives an input value from the set of streaming input data;
   route the set of streaming input data from the plurality of input pathways to the plurality of output pathways based on the context mapping;
   for each output pathway of the plurality of output pathways, combine the received input values to generate an output value for the corresponding output pathway;
   accumulate output values from a plurality of sets of streaming data until at least one output value of the plurality of output values on the plurality of output pathways exceeds a predetermined threshold; and
   compare the plurality of output values to one or more stored sets of data to determine a match.

2. The CA computer device of claim 1, wherein
   the at least one processor is further programmed to adjust the initial context mapping to ensure that none of the output values on the plurality of output pathways exceeds the predetermined threshold.

3. The CA computer device of claim 2, wherein the at least one processor is further programmed to distribute each input pathway to a set of output pathways.

4. The CA computer device of claim 1, wherein the one or more sensors are receiving image data, and wherein the plurality of input pathways each map to a pixel of the received image data.

5. The CA computer device of claim 1, wherein the one or more sensors are receiving streams of at least one of sound, vibration, stock market values, and financial values.

6. The CA computer device of claim 1, wherein the at least one processor is further programmed to:
   for each input pathway of the plurality of input pathways, receive an input value for the corresponding input pathway; and
   divide the input value based on a number of output pathways associated with the input pathway based on the context mapping, wherein each output pathway receives a portion of the input value.

7. The CA computer device of claim 6, wherein the at least one processor is further programmed to divide the input value evenly between the plurality of output pathways.

8. The CA computer device of claim 7, wherein the at least one processor is further programmed to calculate the output value for the output pathway by reducing the assigned portion of the input value based on a distance between the input pathway and the corresponding output pathway.

9. The CA computer device of claim 8, wherein the at least one processor is further programmed to:
   calculate the output value for the output pathway by receiving a plurality of portions of input values from a connected plurality of input pathways; and
   combine the plurality of portions of input values to generate an output value for that output pathway.

10. The CA computer device of claim 1, wherein the match is one of an inexact match and an exact match.

11. The CA computer device of claim 1, wherein each set of streaming input data represents a data plane.

12. The CA computer device of claim 11, wherein the at least one processor is further programmed to:
    compare a first input data plane to a first output data plane;
    if there is a match, associate the first input data plane with the first output data plane; and
    store the first association in the at least one memory device.

13. The CA computer device of claim 12, wherein the at least one processor is further programmed to:
    compare a second input data plane and a second output data plane to a plurality of stored associations; and
    if there is a match, associate the second input data plane with the second output data plane; and
    store the second association between the second input data plane and the second output data plane.

14. The CA computer device of claim 13, wherein the at least one processor is further programmed to:
    determine a reinforcement value for the first association; and
    store the reinforcement value with the first association.

15. The CA computer device of claim 14, wherein the at least one processor is further programmed to:
  detect a subsequent association that matches the stored first association; and
  update the reinforcement value.

16. A cognitive analysis (CA) computer device comprising at least one processor in communication with at least one memory, wherein the at least one processor is programmed to:
  receive a set of streaming input data from one or more sensors;
  perform spatial abstraction on the set of streaming input data to divide the set of streaming input data into a plurality of input pathways, wherein each input pathway of the plurality of input pathways receives an input value from the set of streaming input data;
  route the set of streaming input data from a plurality of input pathways to a plurality of output pathways based on a context mapping;
  for each output pathway of the plurality of output pathways, perform temporal abstraction on the received input values to generate an output value for the corresponding output pathway by accumulating output values from a plurality of sets of streaming data until at least one output value of the plurality of output values on the plurality of output pathways exceeds a predetermined threshold; and
  compare the plurality of output values to one or more stored sets of data to determine an exact match by performing iterative matching.

17. The CA computer device of claim 16, wherein the at least one processor is further programmed to:
  determine that there is no exact match between the plurality of output values to one or more store sets of data; and
  perform inferencing to detect an inexact match.

18. The CA computer device of claim 17, wherein the at least one processor is further programmed to perform inferencing to iteratively create inexact matches to identify an exact match for the plurality of output values.

19. A cognitive analysis (CA) computer device comprising at least one processor in communication with at least one memory device, wherein the at least one processor is programmed to:
  receive a set of streaming input data from one or more sensors;
  divide the set of streaming input data into a plurality of input pathways, wherein each input pathway of the plurality of input pathways receives an input value from the set of streaming input data;
  route the set of streaming input data from a plurality of input pathways to a plurality of output pathways based on a context mapping;
  for each input pathway of the plurality of input pathways, divide the input value based on a number of output pathways associated with the input pathway based on the context mapping, wherein each output pathway receives a portion of the input value;
  for each output pathway of the plurality of output pathways, combine the received input values to generate an output value for the corresponding output pathway;
  accumulate output values from a plurality of sets of streaming data until at least one output value of the plurality of output values on the plurality of output pathways exceeds a predetermined threshold; and
  compare the plurality of output values to one or more stored sets of data to determine a match.

* * * * *